US009467654B2

(12) United States Patent
Kasatani et al.

(10) Patent No.: US 9,467,654 B2
(45) Date of Patent: Oct. 11, 2016

(54) VIDEO-CONFERENCE TERMINAL DEVICE, VIDEO-CONFERENCE SYSTEM, IMAGE DISTORTION CORRECTION METHOD, AND IMAGE DISTORTION CORRECTION PROCESSING PROGRAM PRODUCT

(71) Applicants: Kiyoshi Kasatani, Kanagawa (JP); Hisao Sakamoto, Kanagawa (JP)

(72) Inventors: Kiyoshi Kasatani, Kanagawa (JP); Hisao Sakamoto, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 36 days.

(21) Appl. No.: 14/398,507

(22) PCT Filed: May 16, 2013

(86) PCT No.: PCT/JP2013/064298
§ 371 (c)(1),
(2) Date: Nov. 3, 2014

(87) PCT Pub. No.: WO2013/172478
PCT Pub. Date: Nov. 21, 2013

(65) Prior Publication Data
US 2015/0109401 A1    Apr. 23, 2015

(30) Foreign Application Priority Data

May 18, 2012   (JP) ................ 2012-114482
Feb. 28, 2013  (JP) ................ 2013-039708

(51) Int. Cl.
*H04N 7/15*     (2006.01)
*H04N 7/14*     (2006.01)
(Continued)

(52) U.S. Cl.
CPC ............. *H04N 7/15* (2013.01); *G06T 5/006* (2013.01); *H04N 5/23238* (2013.01);
(Continued)

(58) Field of Classification Search
CPC .... H04N 7/15; H04N 5/3572; H04N 5/2628; H04N 7/142; H04N 7/147; H04N 5/23238; H06T 5/006; H06T 2207/10016
USPC .......................................... 348/14.01–14.16
See application file for complete search history.

(56) References Cited

U.S. PATENT DOCUMENTS 8,169,527 B2 *   5/2012  Yamaoka et al. ........ 348/333.01
2004/0001146 A1  1/2004  Liu et al.
(Continued)

FOREIGN PATENT DOCUMENTS

EP   1 376 467 A2   1/2004
EP   1 376 467 A3   1/2004
(Continued)

OTHER PUBLICATIONS

International Search Report issued Aug. 20, 2013 in PCT/JP2013/064298, filed on May 16, 2013.
(Continued)

*Primary Examiner* — Melur Ramakrishnaiah
(74) *Attorney, Agent, or Firm* — Oblon, McClelland, Maier & Neustadt, L.L.P

(57) ABSTRACT

A local video-conference terminal device includes a wide-angle camera lens, a camera image correction control unit that performs distortion correction processing on an image included in digital video signal from the wide-angle camera lens, a camera image correction table storage unit including correction tables for the distortion correction processing regarding a partial area of the image, a video display unit displaying the digital video signal after distortion correction, and a camera display switching key outputting a signal to select an image correction table. The camera image correction control unit performs the distortion correction processing on the image included in digital video signal using the image correction table selected by switching through the camera display switching key.

10 Claims, 17 Drawing Sheets

(51) Int. Cl.
*G06T 5/00* (2006.01)
*H04N 5/357* (2011.01)
*H04N 5/232* (2006.01)
*H04N 5/262* (2006.01)

(52) U.S. Cl.
CPC ......... *H04N 5/2628* (2013.01); *H04N 5/3572* (2013.01); *H04N 7/142* (2013.01); *H04N 7/147* (2013.01); *G06T 2207/10016* (2013.01)

(56) References Cited

U.S. PATENT DOCUMENTS

| | | |
|---|---|---|
| 2005/0168614 A1 | 8/2005 | Okada et al. |
| 2006/0028735 A1 | 2/2006 | Liu et al. |
| 2006/0033999 A1 | 2/2006 | Liu et al. |
| 2007/0252674 A1 | 11/2007 | Nelson et al. |
| 2011/0090303 A1* | 4/2011 | Wu et al. ................ 348/14.16 |
| 2012/0093365 A1 | 4/2012 | Aragane et al. |
| 2013/0129251 A1 | 5/2013 | Ishii et al. |

FOREIGN PATENT DOCUMENTS

| | | |
|---|---|---|
| EP | 1 613 082 A1 | 1/2006 |
| JP | 7-055336 | 3/1995 |
| JP | 7-218771 | 8/1995 |
| JP | 2003-255424 | 9/2003 |
| JP | 4048511 | 12/2007 |
| JP | 2010-278511 | 12/2010 |
| JP | 2011-097131 | 5/2011 |
| JP | 2012-054907 | 3/2012 |
| JP | 2012-089954 | 5/2012 |

OTHER PUBLICATIONS

Office Action issued Apr. 27, 2015 in Australian Patent Application No. 2013261266.

Extended European Search Report issue Apr. 29, 2015 in Patent Application No. 13791103.8.

* cited by examiner

FIG.3

| IMAGE CORRECTION TABLE NUMBERS | SHARPNESS CORRECTION | DISTORTION CORRECTION |
|---|---|---|
| 0 | N/A | WHOLE |
| 1 | APPLICABLE | CENTER |
| 2 | APPLICABLE | RIGHT AND LEFT |
| 3 | APPLICABLE | CENTER, RIGHT AND LEFT |

FIG.4

| IMAGE CORRECTION TABLE NUMBERS | SHARPNESS CORRECTION | DISTORTION CORRECTION | CAMERA DIRECTION |
|---|---|---|---|
| 0 | N/A | WHOLE | FORWARD |
| 1 | APPLICABLE | CENTER | FORWARD |
| 2 | APPLICABLE | RIGHT AND LEFT | FORWARD |
| 3 | APPLICABLE | CENTER, RIGHT AND LEFT | FORWARD |
| 4 | N/A | WHOLE | BACKWARD |
| 5 | APPLICABLE | CENTER | BACKWARD |
| 6 | APPLICABLE | RIGHT AND LEFT | BACKWARD |
| 7 | APPLICABLE | CENTER, RIGHT AND LEFT | BACKWARD |

FIG.5

| IMAGE CORRECTION TABLE NUMBERS | SHARPNESS CORRECTION | DISTORTION CORRECTION | CAMERA DIRECTION | LCD SLANT |
|---|---|---|---|---|
| 0 | N/A | WHOLE | FORWARD | 90° OR LARGER |
| 1 | N/A | WHOLE | FORWARD | 75° TO UNDER 90° |
| 2 | N/A | WHOLE | FORWARD | 60° TO UNDER 75° |
| 3 | N/A | WHOLE | FORWARD | UNDER 60° |
| 4 | APPLICABLE | CENTER | FORWARD | 90° OR LARGER |
| 5 | APPLICABLE | CENTER | FORWARD | 75° TO UNDER 90° |
| 6 | APPLICABLE | CENTER | FORWARD | 60° TO UNDER 75° |
| 7 | APPLICABLE | CENTER | FORWARD | UNDER 60° |
| 8 | APPLICABLE | RIGHT AND LEFT | FORWARD | 90° OR LARGER |
| 9 | APPLICABLE | RIGHT AND LEFT | FORWARD | 75° TO UNDER 90° |
| 10 | APPLICABLE | RIGHT AND LEFT | FORWARD | 60° TO UNDER 75° |
| 11 | APPLICABLE | RIGHT AND LEFT | FORWARD | UNDER 60° |
| 12 | N/A | WHOLE | BACKWARD | 90° OR LARGER |
| 13 | N/A | WHOLE | BACKWARD | 75° TO UNDER 90° |
| 14 | N/A | WHOLE | BACKWARD | 60° TO UNDER 75° |
| 15 | N/A | WHOLE | BACKWARD | UNDER 60° |
| 16 | APPLICABLE | CENTER | BACKWARD | 90° OR LARGER |
| 17 | APPLICABLE | CENTER | BACKWARD | 75° TO UNDER 90° |
| 18 | APPLICABLE | CENTER | BACKWARD | 60° TO UNDER 75° |
| 19 | APPLICABLE | CENTER | BACKWARD | UNDER 60° |

FIG.15
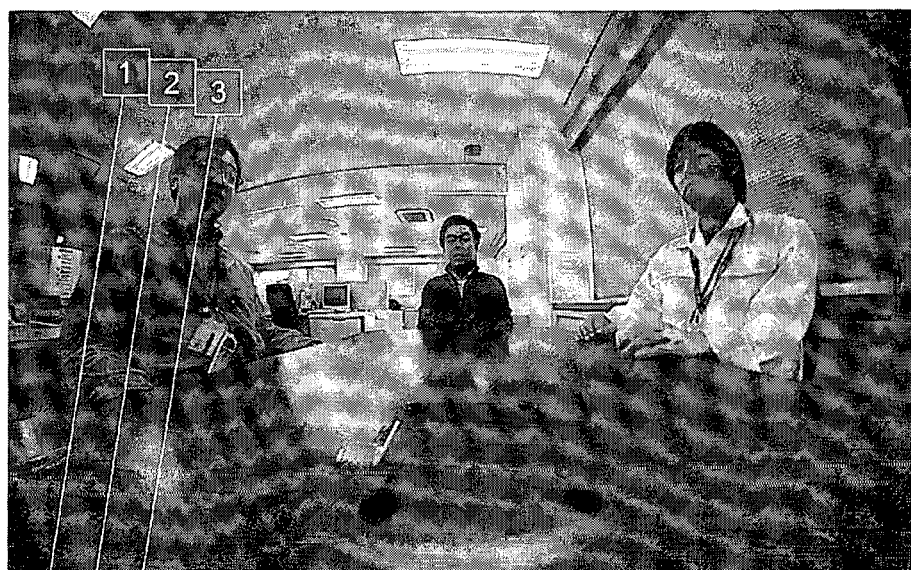
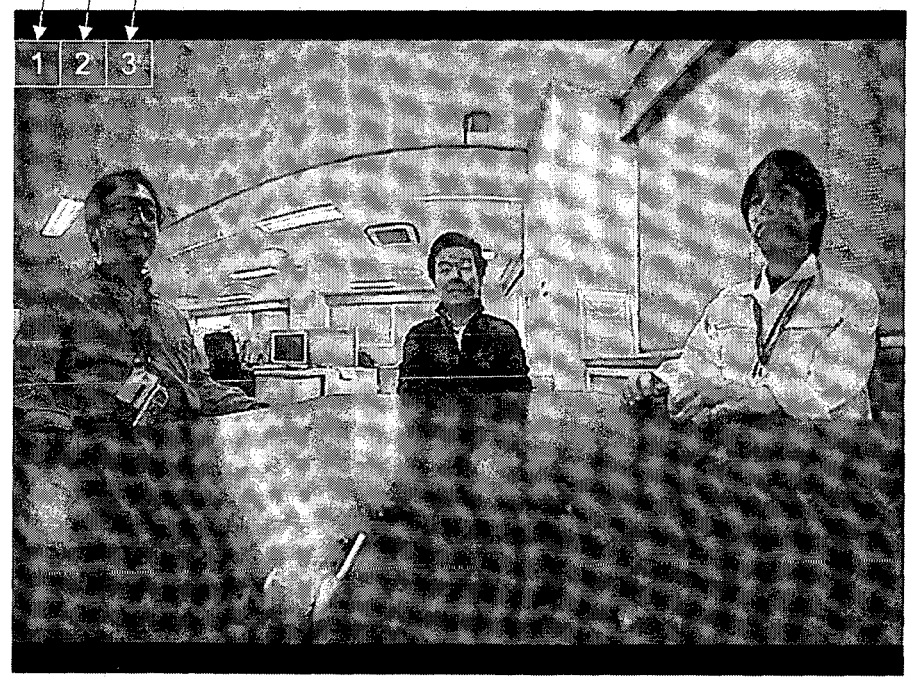

CLIPPED AREA 2    CLIPPED AREA 1    CLIPPED AREA 3

L    L    L

3/4*L   3/2*L

CLIPPED AREA 2    CLIPPED AREA 1    CLIPPED AREA 3

| IMAGE DISPLAY NUMBER | CLIPPED IMAGE |
|---|---|
| 0 | WHOLE |
| 1 | CENTER |
| 2 | RIGHT AND LEFT |
| 3 | CENTER, RIGHT AND LEFT |

FIG.21

BRIGHTNESS ADJUSTMENT TABLE

| BRIGHTNESS ADJUSTMENT TABLE NO. | PARAMETER |
|---|---|
| TABLE 1 | BRIGHTNESS STANDARD AREA 1: STARTING POINT IN X-AXIS DIRECTION |
| | BRIGHTNESS STANDARD AREA 1: ENDING POINT IN X-AXIS DIRECTION |
| | BRIGHTNESS STANDARD AREA 1: STARTING POINT IN Y-AXIS DIRECTION |
| | BRIGHTNESS STANDARD AREA 1: ENDING POINT IN Y-AXIS DIRECTION |
| | BRIGHTNESS ADJUSTMENT VALUE 1 |
| TABLE 2 | BRIGHTNESS STANDARD AREA 2: STARTING POINT IN X-AXIS DIRECTION |
| | BRIGHTNESS STANDARD AREA 2: ENDING POINT IN X-AXIS DIRECTION |
| | BRIGHTNESS STANDARD AREA 2: STARTING POINT IN Y-AXIS DIRECTION |
| | BRIGHTNESS STANDARD AREA 2: ENDING POINT IN Y-AXIS DIRECTION |
| | BRIGHTNESS ADJUSTMENT VALUE 2 |
| TABLE 3 | BRIGHTNESS STANDARD AREA 3: STARTING POINT IN X-AXIS DIRECTION |
| | BRIGHTNESS STANDARD AREA 3: ENDING POINT IN X-AXIS DIRECTION |
| | BRIGHTNESS STANDARD AREA 3: STARTING POINT IN Y-AXIS DIRECTION |
| | BRIGHTNESS STANDARD AREA 3: ENDING POINT IN Y-AXIS DIRECTION |
| | BRIGHTNESS ADJUSTMENT VALUE 3 |

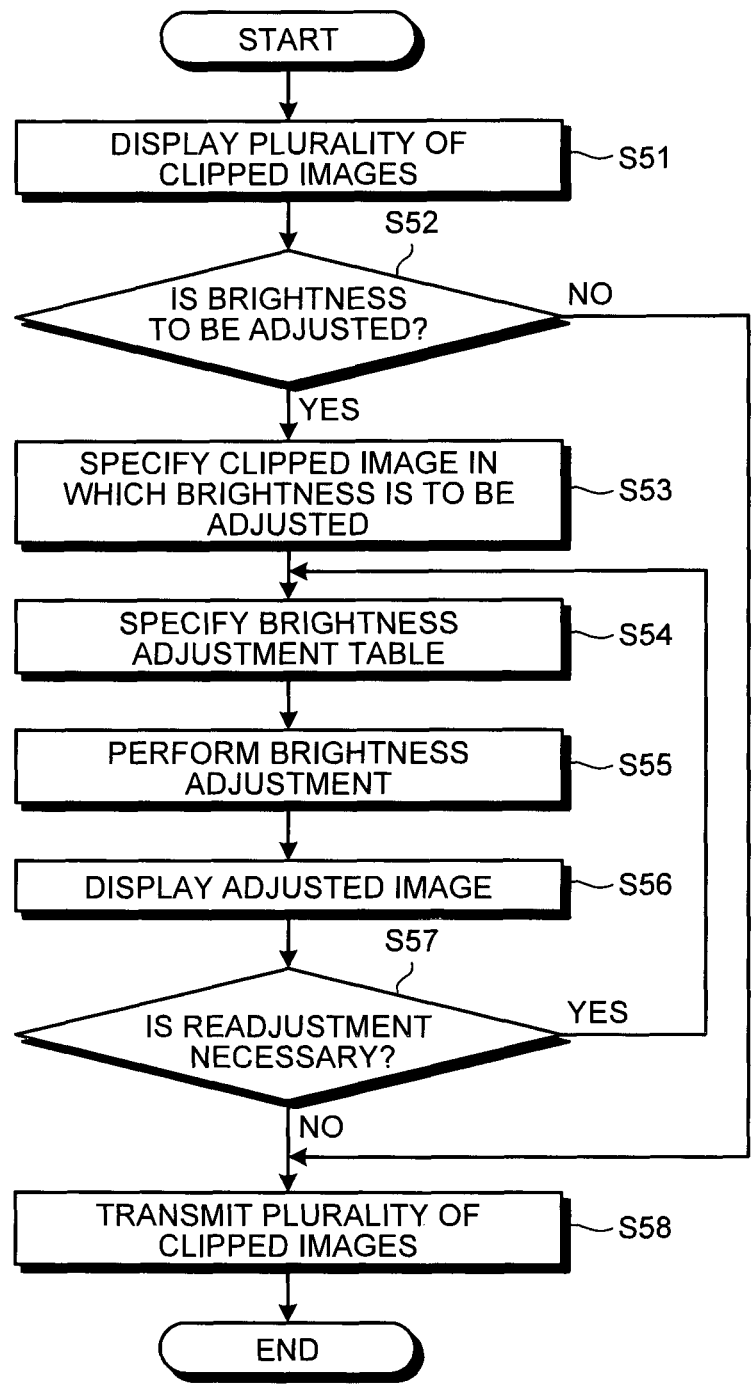

VIDEO-CONFERENCE TERMINAL DEVICE, VIDEO-CONFERENCE SYSTEM, IMAGE DISTORTION CORRECTION METHOD, AND IMAGE DISTORTION CORRECTION PROCESSING PROGRAM PRODUCT

TECHNICAL FIELD

The present invention relates to a video-conference terminal device, a video-conference system, an image distortion correction method, and an image distortion correction processing program product.

BACKGROUND ART

Video-conference systems are widely used with which a remote conference is held between remote sites through a communication network such as the Internet. In the conventional conference systems, a terminal device of a remote conference system is used in a conference room of one of the parties of the attendees that are having a remote conference.

With the terminal device of the conventional remote conference systems, images of the conference room including the parties of the conference and audio in the conference room such as speeches of the attendees are captured. The captured images and audio are converted into digital data, and transmitted to the terminal device of the other party. The transmitted images are displayed on a display in the conference room of the other party and the audio is output through a speaker in the conference room of the other party. This enables a conference to be held between remote sites in almost the same condition as a real (i.e., not virtual) conference held at a site.

The video-conference systems ensure a substantially wide angle of field to display many attendees in a display unit of the terminal device. This is achieved by providing a zooming mechanism or a moving mechanism that moves upward and downward and to the right and the left in a camera function of the terminal device, or adopting a multicamera including a plurality of cameras.

A fisheye lens camera device is disclosed in Japanese Patent No. 4048511, which includes an image correction processing unit that corrects distortion of images captured through the fisheye lens camera. The image correction processing unit in the device configured to perform calculation by combining two types of coordinate transformation. One coordinates transformation corrects the installation angle of the fisheye lens camera and the other coordinates transformation corrects distortion of images captured through the fisheye lens.

DISCLOSURE OF INVENTION

Although the conventional video-conference systems do not need a processing circuit or the like for correcting the distortion of images, they have terminal devices with an increased size and weight, thus the costs for the systems are also increased. Typical conventional video-conference systems are therefore achieved as systems including expensive, standing devices.

Additionally, the fisheye lens camera device disclosed in Patent Document 1 cannot recognize the status of capturing. This makes it impossible for users to selectively use an intended image correction method in the fisheye lens camera device.

In view of the circumstances above, the present invention aims to provide a video-conference system including a wide-angle camera and having increased usability, and an image distortion correction method, and to provide a video-conference system utilizing the wide-angle camera and adopting the simple structure, thereby correcting an image automatically or in a preferred mode of an operator according to the status of the image, and further suppressing the increased size and weight of the terminal device, which achieves portability.

In order to achieve the above mentioned object, a video-conference terminal device according to the present invention includes: a wide-angle camera comprising a wide-angle camera lens; a first control unit that receives a digital video signal from the wide-angle camera and performs distortion correction processing on an image included in the digital video signal; a storage unit that stores therein image correction information used when the first control unit performs the image distortion correction processing, the image correction information comprising correction information for the distortion correction processing regarding at least a partial area of the image included in the digital video signal from the wide-angle camera; a second control unit that transmits and receives a signal to and from another video-conference terminal device coupled to a network; a providing unit that provides the digital video signal of the wide-angle camera and a digital video signal on which the distortion correction has been performed; and an operating unit that outputs a signal to switch pieces of the image correction information stored in the storage unit every time being operated, wherein the first control unit performs distortion correction processing on the image included in the digital video signal using a piece of the image correction information that has been selected by switching through the operating unit.

According to the present invention, a video-conference system including a wide-angle camera and having increased usability and an image distortion correction method thereof can be provided, and a video-conference system utilizing the wide-angle camera and adopting the simple structure, thereby correcting an image automatically or in a preferred mode of an operator according to the status of the image, and further suppressing the increased size and weight of the terminal device, which achieves portability, can be provided.

BRIEF DESCRIPTION OF DRAWINGS

FIG. 3 is an exemplary view of an image correction table of the video-conference terminal device for the video-conference system according to the embodiment.

FIG. 4 is another exemplary view of the image correction table of the video-conference terminal device for the video-conference system according to the embodiment.

FIG. 5 is yet another exemplary view of the image correction table of the video-conference terminal device for the video-conference system according to the embodiment.

FIG. 15 is a view for explaining a concept of the image distortion correction method illustrated in FIG. 14.

FIG. 21 is an exemplary view of a brightness adjustment table used for adjusting the brightness of the clipped image through the image distortion correction method in the video-conference terminal device for the video-conference system according to the embodiment.

FIG. 22 is a flowchart for adjusting the brightness of the clipped image using the brightness adjustment table illustrated in FIG. 21 through the image distortion correction method in the video-conference terminal device for the video-conference system according to the embodiment.

BEST MODE(S) FOR CARRYING OUT THE INVENTION

The embodiment of the present invention is described below with reference to the accompanying drawings.

External View of Video-Conference Terminal Device

Figure 1:
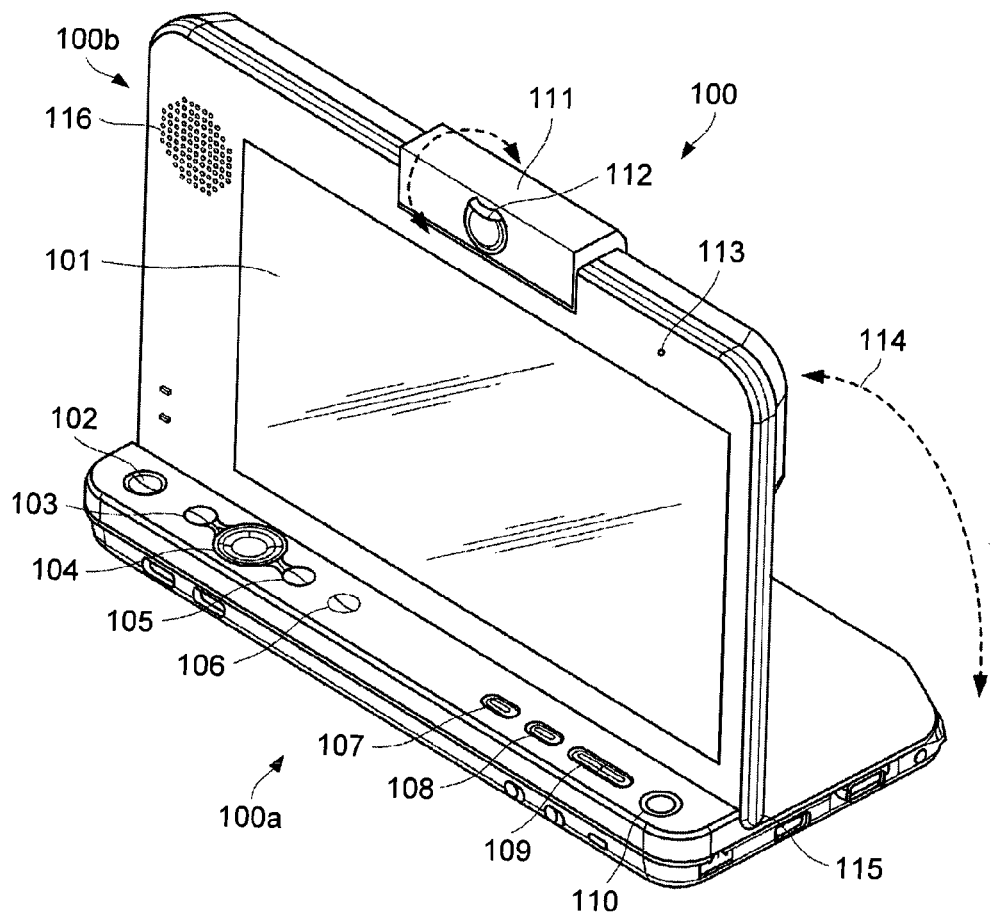
FIG. 1 is a perspective view of a video-conference terminal device for a video-conference system according to an embodiment of the present invention.

FIG. 1 is a perspective view of a video-conference terminal device 100 for a video-conference system according to an embodiment of the present invention.

The video-conference terminal device 100 includes a main body 100a and a display unit 100b. The main body 100a is placed on an almost horizontal plane as illustrated in FIG. 1. The display unit 100b is rotatable (movable rotationally) by approximately 90 degrees from the main body 100a through liquid crystal display (LCD) hinge movement (illustrated with the numeral 114 in the diagram) around an LCD hinge unit 115.

The display unit 100b includes a liquid crystal display unit 101 as an example of an information display unit. A super wide-angle camera 112 as an example of a wide-angle camera is provided on the upper part of the liquid crystal display unit 101.

The lens of the super wide-angle camera 112 is made of glass or plastic materials and has an angle of field from 130 to 190 degrees, for example. A wide-angle camera may be used instead of the super wide-angle camera 112, which has an angle of field of 110 or larger degrees, for example.

The wide-angle camera herein includes a super wide-angle camera in the description.

A liquid crystal display (LCD) is referred to and abbreviated as an LCD in the present embodiment.

An LCD is used as an information display unit of the display unit 100b in the present embodiment; however, the embodiment is not limited to this example. A plasma display, an organic light emitting display (OLED), or other displays may be adopted, for example.

The liquid crystal display unit 101 is defined as an information display unit and the LCD hinge unit 115 is also referred to as an information display hinge unit.

The video-conference terminal device 100 includes a central processing unit (CPU), a read only memory (ROM) that stores fixed data, a random access memory (RAM) that temporarily stores data, a backup memory including a rewritable non-volatile memory, an input interface circuit including a buffer, and an output interface circuit.

The super wide-angle camera 112 is retained in a camera rotation mechanism 111 that is rotatable by approximately 180 degrees around an axis parallel to the rotation axis of the LCD hinge unit 115. The super wide-angle camera 112 can rotate from the forward direction where the liquid crystal display unit 101 is provided to the backward direction as indicated by the arrow.

The display unit 100b includes a microphone 113 and a speaker 116. The microphone and the speaker, however, are necessarily embedded in the video-conference terminal device 100. The display unit 100b may be coupled to an external microphone and speaker or an external speaker microphone through a universal serial bus (USE) terminal provided in the video-conference terminal device 100.

The video-conference terminal device 100 further includes a video output port of High-Definition Multimedia Interface (HDMI) (registered trademark) and video graphics array (VGA). Video content displayed on the liquid crystal display unit 101 may also be therefore displayed on an external monitor or an external projector.

As illustrated in FIG. 1, a power supply key 102, a menu key 103, and arrow keys (up and down, right and left) 104 are provided on the left side portion of the main body 100*a* of the video-conference terminal device 100. The power supply key 102 is used for turning on and off the power supply. The menu key 103 is used for displaying settings and operation menus executable in the video-conference terminal device 100. The arrow keys (up and down, right and left) 104 are used for performing key operations on the screen of the liquid crystal display unit 101, using a software keyboard, for example.

An Enter key 105 and an Off key 106 are further provided on the left side portion of the main body 100*a*. The Enter key 105 (corresponding to an Enter key on typical keyboards) is used for selecting an OK button on the screen or adopting the key selected on the software keyboard using the arrow keys (up and down, right and left) 104. The Off key 106 is used to end the video-conference.

As illustrated in FIG. 1, a camera switching key 107 and an LCD brightness switching key 108 are provided on the right side portion of the main body 100*a* of the video-conference terminal device 100. The camera switching key 107 is an example of an operating unit that displays an intended area of an image and executing the distortion correction processing, which will be described later. The LCD brightness switching key 108 is used for adjusting the brightness level of the screen of the liquid crystal display unit 101.

An audio volume key 109 and a volume mute key 110 are further provided on the right side portion of the main body 100*a*. The audio volume key 109 is used for adjusting the volume output from the speaker 116. The volume mute key 110 is used for preventing the audio captured through the microphone 113 from being transmitted to the video-conference terminal device 100 of the other party.

Figure 2:
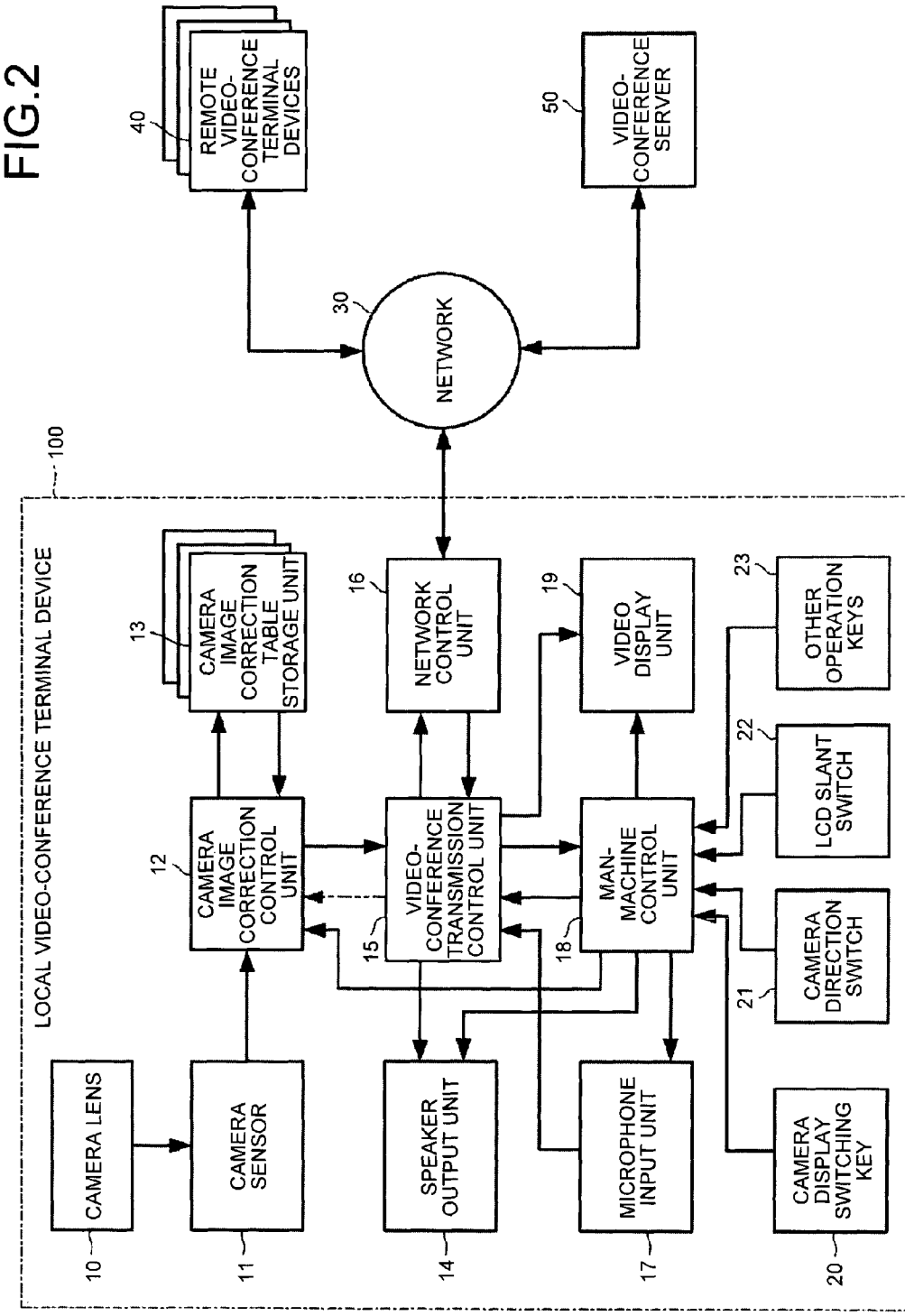
FIG. 2 is an exemplary block diagram of the video-conference system including a block diagram of the video-conference terminal device illustrated in FIG. 1.

Outline Structure of Video-Conference System Including Video-Conference Terminal Device FIG. 2 is an exemplary block diagram of the video-conference system including a functional block diagram of the video-conference terminal device 100 illustrated in FIG. 1. The video-conference system includes the video-conference terminal device 100 in a local site, some video-conference terminal devices 40 in remote sites, a video-conference server 50, and a network 30. The video-conference terminal device 100 in a local site (a terminal in a certain business base) is illustrated as a block enclosed with an alternate long and short dash line in FIG. 2. The remote video-conference terminal devices 40 (terminals in some business bases remote from the terminal in the certain business base) are in some remote sites where the video-conference is held. The video-conference server 50 controls the video-conference system. The network 30 couples these components to each other.

In the present embodiment, an attendee who is captured with the local video-conference terminal device 100 performs the distortion correction processing on his own image displayed on the liquid crystal display unit 101 of the local video-conference terminal device 100 while monitoring his own image displayed on the liquid crystal display unit 101 of the local video-conference terminal device 100. The attendee then transmits the image on which the distortion correction processing has been performed to the remote video-conference terminal device 40.

In the same manner, an attendee who is captured with the remote video-conference terminal device 40 performs the distortion correction processing on his own image displayed on the remote video-conference terminal device 40 while monitoring his own image displayed on the remote video-conference terminal device 40. The attendee then transmits the image on which the distortion correction processing has been performed to the local video-conference terminal device 100.

The local video-conference terminal device 100 has the structure similar to the remote video-conference terminal device 40. The functional block included in the local video-conference terminal device 100 is described hereinafter in a representative manner.

The camera lens 10 corresponds to a lens of the super wide-angle camera 112 (FIG. 1) that captures images of the video-conference. The camera lens 10 is made of glass or plastic materials. Optical signals of the images including an attendee at the conference, which is a subject to be captured by the camera lens 10 are transmitted to a camera sensor 11.

The camera sensor 11 is an image sensor and converts the optical signals transmitted from the camera lens 10 into digital video signals. This image sensor is achieved with a charge coupled device (CCD) or a complementary metal-oxide semiconductor (CMOS) sensor. The image sensor is a photoelectric conversion device that generates an image of 640 (in a horizontal direction) by 480 (in a vertical direction) pixels, for example.

The digital video signals converted from the optical signals through the camera sensor 11 are transmitted to a camera image correction control unit 12 as an example of a first control unit.

After receiving the digital video signals from the camera sensor 11, the camera image correction control unit 12 corrects the distortion in the image of the video signals according to the content of an image correction table as an example of image correction information that has been switched to and selected according to the signals from the camera switching key 107 (FIG. 1), which will be described later. The camera image correction control unit 12 then transmits the corrected digital video signal's to the video-conference transmission control unit 15.

The corrected digital video signals are transmitted to the video display unit 19 and displayed on the liquid crystal display unit 101. The attendee watching the liquid crystal display unit 101 operates the camera switching key 107, thereby monitoring the image on which the distortion correction processing is performed using another image correction table, on the liquid crystal display unit 101 to select the appropriate image.

The digital video signals of the selected image are transmitted to the video-conference terminal devices 40 through the network control unit 16 as an example of a second control unit and the network 30, and then displayed on the liquid crystal display unit 101 of the video-conference terminal devices 40. This enables the attendee at the conference on the site where the remote video-conference terminal device 40 is used to progress the conference while watching the image on which the distortion correction processing has been appropriately performed.

When the camera switching key 107 is operated, an image correction table number is transmitted to a camera image correction table storage unit 13 as an example of a storage unit to select the image correction table, which will be described later.

The camera image correction table storage unit 13 is achieved with a memory embedded in the video-conference terminal device 100 such as a hard disk drive, a ROM, and a RAM and stores therein at least one image correction table.

The image correction table will be described later with reference to FIG. 3 to FIG. 5. The image correction table exemplified has the tabular data structure, however, any type of data structure may be used. The image correction table does not specify a tabular data structure, therefore, it is also called image correction information.

The speaker output unit 14 is achieved with the speaker 116 (FIG. 1) and reproduces the audio using the digital audio signals received from the video-conference transmission control unit 15 according to reproducing volume signals received from the man-machine control unit 18.

The digital audio signals to be reproduced have been captured by the microphone input, unit 17 of another remote video-conference terminal device 40 and output from the network control unit 16. The output digital audio signals have been then transmitted to the video-conference transmission control unit 15 through the network 30, and the network control unit 16 of the local video-conference terminal device 100.

The video-conference transmission control unit 15 performs call control of the video-conference and transmission control of the digital video signals and the digital audio signals. These control methods of the video-conference will be described later. The video-conference transmission control unit 15 is achieved with the central processing unit (the CPU) and a computer program executed thereon and stored in the ROM.

The camera image correction control unit 12 includes a storage unit and stores therein images of the video-conference, images on which the distortion correction processing has been performed, and images of clipped areas.

The network control unit 16 controls transmission and reception of data between the network 30 and the video-conference terminal device 100. Specifically, the network control unit 16 transmits the transmitted data received from the video-conference transmission control unit 15 to the network 30 and transmits the received data from the network 30 to the video-conference transmission control unit 15.

As described above, the network control unit 16 executes transmission and reception of data between the video-conference transmission control unit 15 and the network 30 transparently. The network control unit 16 is achieved with a network interface. It is to be noted that wired or wireless transmission and reception means may be used for the network interface.

The microphone input unit 17 captures the audio of the video-conference with the volume size based on the record volume signal received from the man-machine control unit 18, converts the audio into the digital audio signals, and transmits them to the video-conference transmission control unit 15.

The microphone input unit 17 is achieved with the microphone 113 (FIG. 1). The digital audio signals transmitted to the video-conference transmission control unit 15 are transmitted to another remote video-conference terminal device 40 at a site where the video-conference is being held through the network control unit 16 and the network 30.

The man-machine control unit 18 controls operations by operators (or users) on the super wide-angle camera 112 or the keys on the video-conference terminal device 100. For example, the man-machine control unit 18 transmits the image data captured through the super wide-angle camera 112 of the video-conference terminal device 100 to the video display unit 19 and displays the image data on the liquid crystal display unit 101 (FIG. 1).

For another example, when a user operates a camera display switching key 20, a camera direction switch 21 as an example of a camera direction detection unit, or other operation keys 23 while watching the liquid crystal display unit 101 (FIG. 1); or when an LCD slant switch 22 as an example of an LCD slant detection unit detects a predetermined slant of the LCD (i.e., the angle of elevation of the super wide-angle camera 112), the man-machine control unit 18 receives corresponding signals such as a camera switching signal, a camera direction signal, an LCD slant signal, and other operation keys' signals from the camera display switching key 20, the camera direction switch 21, the LCD slant switch 22, or the other operation keys 23, respectively.

The camera direction switch 21 is adopted as a camera direction detection unit in the present embodiment. The present invention, however, is not limited to this example. A sensor may be adopted that detects the direction of the optical axis of the camera lens 10.

The LCD slant switch 22 is adopted as an LCD slant detection unit in the present embodiment. The present invention, however, is not limited to this example. A sensor may be adopted that detects the angle of slant of the optical axis of the camera lens 10.

The camera display switching key 20 corresponds to the camera switching key 107 (FIG. 1) and the camera direction switch 21 is turned on or off depending on the position for the rotational position, i.e., on the front and back sides of the camera rotation mechanism 111 (FIG. 1).

The LCD slant switch 22 is turned on or off when the display unit 100b comes into the positions of some predetermined angles according to LCD hinge movement 114 of the LCD hinge unit 115 (FIG. 1). The other operation keys 23 correspond to, for example, the power supply key 102, the menu key 103, the arrow keys (up and down, right and left) 104, the Enter key 105, the Off key 106, the LCD brightness switching key 108, the audio volume key 109, and the volume mute key 110 illustrated in FIG. 1.

As described above, the liquid crystal display unit 101 may be a display not including an LCD. The LCD slant switch 22 is thus also called an information display slant switch and the LCD brightness switching key 108 is also called an information display brightness switching key.

The various types of keys in the terminal device are not necessarily provided in a key shape. The various types of keys in the terminal device may be achieved with a touch panel, for example, in which a touch sensor is embedded in a display panel such as an LCD. The operation key in the embodiment of the present invention, therefore, is also called an operating unit, which may be provided in any shape.

After receiving other operation signals of another key from the other operation keys 23, the man-machine control unit 18 performs the control corresponding to the key actually operated by the user. When the audio volume key 109 is operated, for example, the man-machine control unit 18 transmits the reproducing volume signal to the speaker output unit 14 for instructing the speaker output unit 14 to reproduce the audio with the volume specified through the audio volume key 109.

When the volume mute key 110 is operated, the man-machine control unit 18 transmits the record volume signal to the microphone input unit 17 for instructing the microphone input unit 17 to capture no audio input.

When the Enter key 105 is operated while the video-conference start screen is displayed, the man-machine control unit 18 transmits a video-conference room address signal to the video-conference transmission control unit 15.

Specifically, as described in detail later, when the video-conference room address signal is transmitted to the video-conference server 50, the video-conference is started. When the Off key 106 is operated while the video-conference screen is displayed, the man-machine control unit 18 transmits a video-conference termination-request signal to the video-conference transmission control unit 15.

Also, as described in detail later, when the video-conference termination request signal is transmitted to the video-conference server 50 the video-conference terminal device 100 that has issued the termination request is disconnected from the network.

When receiving the camera switching signal from the camera display switching key 20, the camera direction signal from the camera direction switch 21, or the LCD slant signal from the LCD slant switch 22, the man-machine control unit 18 transmits a camera image correction switching signal to the camera image correction control unit 12.

Once the camera image correction control unit 12 receives the camera image correction switching signal from the man-machine control unit 18, the camera image correction control unit 12 converts the signal into an image correction table switching signal and transmits the image correction table switching signal to the camera image correction table storage unit 13.

Once the camera image correction table storage unit 13 receives the image correction table switching signal from the camera image correction control unit 12, the camera image correction table storage unit 13 appropriately switches the image correction table according to the image correction table switching signal and transmits the data of the image correction table to the camera image correction control unit 12.

The camera image correction control unit 12 performs the image distortion correction processing according to the data of the image correction table. If the camera image correction table storage unit 13 receives the camera switching signal directly from the camera display switching key 20, the camera image correction table storage unit 13 responses in the same manner as described above in preference to switching the image correction table due to the camera direction signal from the camera direction switch 21 or the LCD slant signal from the LCD slant switch 22.

When the operator operates the camera display switching key 20, the operator only has to select the appropriate image correction table out of the image correction tables that have been automatically selected.

The camera image correction control unit 12 corrects the digital video signals using the data of the image correction table switched to and selected at that time from the camera image correction table storage unit 13. The camera image correction control unit 12 is achieved with the CPU embedded in the video-conference terminal device 100 and a computer program executed on the CPU.

The video display unit 19 displays a predetermined screen on the liquid crystal display unit 101 according to the data of the screen received from the man-machine control unit 18 or the videoconference video signals received from the video-conference transmission control unit 15.

Image Correction Table 1

FIG. 3 illustrates an example of the image correction tables selected every time a user presses the camera switching key 107 (FIG. 1). The image correction table defines the relation among image correction table numbers ("image correction table numbers"), necessity of sharpness correction ("sharpness correction"), and areas on which the distortion correction processing is performed ("distortion correction").

For example, if the user selects "0" for the image correction table number, the "sharpness correction" correction is "n/a" (not applicable) and "distortion correction" is "whole". That is to say, the distortion correction processing is performed on the clipped area obtained by cutting out almost the whole of the image including all of the attendees at the conference, on which the distortion correction processing has not yet been performed.

As another area on which the distortion correction processing is performed, "center" means that the distortion correction processing is performed on the clipped image obtained by cutting out almost the center portion of the image, on which the distortion correction processing has not yet been performed.

As another area on which the distortion correction processing is performed, "right and left" means that the distortion correction processing is performed on the clipped images obtained by cutting out almost the right side portion and almost the left side portion of the image, on which the distortion correction processing has not yet been performed, and the processed images are displayed together on one screen.

As another area, "center, right and left" means that the distortion correction processing is performed on the clipped images obtained by cutting out almost the center portion, almost the right side portion, and almost the left side portion of the image, on which the distortion correction processing has not yet been performed, and the processed images are displayed together on one screen.

The image correction table adopts the following distortion correction table to perform the distortion correction processing on a predetermined area of an image, for "distortion correction", for example. In the corrected area, the addresses indicate the pixel address after distortion correction, that is, the address for the pixel to be displayed after distortion correction. The X-coordinate value and the Y-coordinate value indicate the dot position on the plane of the photoelectric conversion device of the camera sensor 11.

The pixel address 0 after distortion correction: the X-coordinate value and the Y-coordinate value of the photoelectric conversion device before distortion correction The pixel address 1 after distortion correction: the X-coordinate value and the Y-coordinate value of the photoelectric conversion device before distortion correction The pixel address 2 after distortion correction: the X-coordinate value and the Y-coordinate value of the photoelectric conversion device before distortion correction (the middle part is omitted)

The pixel address 307199 after distortion correction: the X-coordinate value and the Y-coordinate value of the photoelectric conversion device before distortion correction The distortion correction table indicates that the dot position on the plane of the photoelectric conversion device of the camera sensor 11, which corresponds to the pixel address after distortion correction, is converted according to the X and Y coordinate values before distortion correction.

Specifically, for the X-axis of the X and Y coordinates, the positive direction is determined as rightward in the horizontal direction as one faces the plane of the photoelectric conversion device of the camera sensor 11. For the Y-axis of the X and Y coordinates, the positive direction is determined as downward in the vertical direction as one faces the plane of the photoelectric conversion device of the camera sensor 11.

Therefore, the pixel address 0 after distortion correction indicates the actual value for the X and Y coordinates (0,0) for the dot on the upper left as one faces the plane of the photoelectric conversion device of the camera sensor 11. The address 1 after distortion correction indicates the actual value for the X and Y coordinates (1,0) for the dot shifted by one dot in the positive direction along the X-axis.

The subsequent coordinates of the rightmost dot along the X-axis on the same Y-coordinate value 0 are the coordinates (0,1), which indicates the leftmost dot along the X-axis and the Y-coordinate 1 below the Y-coordinate value 0, and the actual value for the coordinates is used.

In the same manner, if the address on the display monitor indicates, for example, 640 dots in the horizontal direction and 480 dots in the vertical direction, the last address value is: 640×480−1=307199.

The X and Y coordinate values after distortion correction are calculated according to a predetermined correction algorithm. The values in the coordinates are real numbers and the numbers after the decimal point are interpolated among the peripheral dots.

When the distortion correction processing is performed, after the camera image correction control unit 12 receives the digital video signals from the camera sensor 11, the camera image correction control unit 12 utilizes the above-described table corresponding to the dots of the digital video signals and transmits the digital video signals to which the table has been applied, to the video-conference transmission control unit 15.

When the subject of the distortion correction processing is selected, the dots of the image corresponding to the area of the selected subject are associated with the Pixel addresses after correction in the above-described table, whereby the distortion correction processing is performed on the subject to be corrected.

The values in the X and Y coordinates before distortion correction corresponding to the respective addresses in the above-described table are calculated in advance for performing dots moving processing in real time. The distortion correction processing on almost the whole, almost the center portion, almost the right side portion, and almost the left side portion of an image on the camera sensor 11, therefore, can be performed simply and quickly.

The "sharpness correction" serves as a filter used for performing edge enhancement of an image and is used for suppressing the blurring of the image enlarged when "center" or "right and left" is set for "distortion correction".

The sharpness correction is performed in the camera image correction control unit 12. Specifically, the sharpness correction is performed by space-filtering, for example, on the image before or after moving to the coordinate value of the address.

The image correction table number is included in the camera image correction switching signal transmitted from the man-machine control unit 18 to the camera image correction control unit 12 when a user presses the camera switching key 107 (FIG. 1).

Image Correction Table 2

FIG. 4 illustrates another example of the image correction tables switched and selected every time a user presses the camera switching key 107 (FIG. 1).

The image correction table defines the relation among the image correction table number ("image correction table numbers"), the necessity of sharpness correction ("sharpness correction"), the area on which the distortion correction processing is performed ("distortion correction"), and the direction of the camera ("camera direction"). The difference from the image correction table illustrated in FIG. 3 is that "camera direction" is taken into account.

When the super wide-angle camera 112 (FIG. 1) is on the side where the liquid crystal display unit 101 is provided, the direction of the camera is determined as "forward". When the camera rotation mechanism 111 (FIG. 1) rotates by approximately 180 degrees, thus the super wide-angle camera 112 (FIG. 1) rotates from the front side where the liquid crystal display unit 101 is provided to the back side, the direction of the camera is determined as "backward".

When "camera direction" is "forward", "distortion correction" is performed on any area in the image. When "camera direction" is "backward" and something else than people is mainly captured, the distortion correction processing is not applied to the "right and left" area.

That is to say, when "camera direction" is switched to "backward" while either one of the image correction table numbers 0 to 3 is used, the image correction table can be switched to only the image correction table numbers 4 or 5.

When the direction of the camera is "backward", the image correction table in which the direction of the camera is not taken into account as illustrated in FIG. 3 is automatically excluded from the image correction tables that a user can select.

Specifically, when the image correction table illustrated in FIG. 4 is used, the user only has to select the image correction table numbers "4" to "7". For example, when the correction table number "4" is selected, the sharpness correction is "n/a", and "distortion correction" is "whole".

As described above, the area on which the distortion correction processing is performed can be restricted under a predetermined condition such as "forward" or "backward" of the direction of the camera. For example, the correction table is provided, which indicates the area on which the distortion correction processing is performed that can be selected when the direction of the camera is selected. When the predetermined condition, is selected, the correction table is referred to for narrowing down the area on which the distortion correction processing is performed to specific ones.

It is to be noted that the image correction table 2 includes the distortion correction table illustrated in the above description of the image correction table 1. The distortion correction table is selected accordingly when the area on which the distortion correction processing is performed is selected.

Image Correction Table 3

FIG. 5 illustrates yet another example of the image correction tables selected every time a user presses the camera switching key 107 (FIG. 1). The image correction table defines the relation among the image correction table number ("image correction table numbers"), the necessity of sharpness correction ("sharpness correction"), the area on which the distortion correction processing is performed ("distortion correction"), the direction of the camera ("camera direction"), and the slant of the LCD "LCD slant".

The image correction table illustrated in FIG. 5 differs from the image correction table illustrated in FIG. 4 in that the slant of the LCD, that is, the angle of elevation of the super wide-angle camera 112 (FIG. 1) is taken into account. The angle of the LCD is detected by a mechanism for the LCD hinge movement 114 (FIG. 1) and the switch 22 provided in the LCD hinge unit 115 (FIG. 1).

The "LCD slant" includes four detection stages of the LCD hinge movement 114: "90° or larger", "75° to under 90°", "60° to under 75°", and "under 60°" based on the main body 100*a* placed within the horizontal plane.

Although the "LCD slant" column illustrated in FIG. 5 includes the four detection stages of the LCD hinge movement 114: "90° or larger", "75° to under 90°", "60° to under 75°", and "under 60°", the four detection stages may be represented with the values 0 to 3.

A coordinates transformation table for the distortion correction processing is prepared in advance, in which the angle of elevation of the super wide-angle camera 112 (FIG. 1) includes 0, 15, 30, and 45 degrees corresponding to the "60° to under 75°", and "under 60°" described above.

In the same manner as the image correction table illustrated in FIG. 4, when "camera direction" is "forward", all type of "distortion correction" are adopted. By contrast, when "camera direction" is "backward" and "distortion correction" is "right and left", the distortion correction processing is not performed because something else than people is captured.

That is to say, when "camera direction" is switched to "backward" while either one of the image correction table numbers 0 to 7 is used, the image correction table is switched to either one of the image correction table numbers 12 to 19. When "camera direction" is switched to "backward" while either one of the image correction table numbers 8 to 11 is used, the image correction table is switched to either one of the image correction table numbers 12 to 15.

In the image correction table illustrated in FIG. 5, when the "LCD slant" is "75° to under 90°" and the direction of the camera is "backward", the user can select either the image correction table number "13" or "17", rather than selecting out of many image correction table numbers.

As the "LCD slant" is changed, the angle of the camera is also changed, therefore the content of the image distortion correction processing also needs to be changed. For that reason, like the table for the distortion correction processing described in the image correction table 1, the image correction table appropriate for the angle of the liquid crystal display unit 101 is generated in advance and stored in the camera image correction table storage unit 13.

When the user changes the angle of the display unit 100b including the liquid crystal display unit 101 with the movement such as the LCD hinge movement 114 (FIG. 1), the image correction table corresponding to the angle of the liquid crystal display unit 101 is automatically selected.

As described above, by switching selectively or automatically the camera image correction table according to the LCD slant or the direction of the camera, an image appropriate for the video-conference can be readily provided.

The image correction table 3 also includes the distortion correction table illustrated in the above description of the image correction table 1 or the correction table that restricts the area on which the distortion correction processing is performed under predetermined conditions.

Video-Conference Server and Network

As illustrated in FIG. 2, the video-conference terminal devices 100 and 40, and the video-conference server 50 are coupled to the network 30. The video-conference server 50 controls the video-conference room. Once the video-conference server 50 receives a start request for a video-conference room address from the video-conference terminal device 100, the video-conference server 50 generates a video-conference room for starting the video-conference.

Once the video-conference server 50 starts the video-conference room, the video-conference server 50 receives the compressed digital video signals and the compressed digital audio signals from all of the video-conference terminal devices 100 and 40 attending in the video-conference room. The video-conference server 50 expands the respective digital video signals and the digital audio signals to compose an image and a piece of audio from the signals, and then compresses again the image and the audio to transmit them to all of the video-conference terminal devices.

The remote video-conference terminal devices 100 and 40, therefore, can be used for checking the status of the conference being held at the business bases through the images and the audio.

Once the video-conference server 50 receives a termination request of the video-conference from any one of the video-conference terminal devices 100 and 40 during the video-conference, the video-conference server 50 disconnects the video-conference terminal devices 100 or 40 that issued the request, from the video-conference room. Once all of the involved video-conference terminal devices 100 and 40 are disconnected, the video-conference room is terminated.

The video-conference room here means a virtual place where the video-conference terminal devices 100 and 40 are coupled to each other (one-on-one or in a multipoint manner) and the video-conference is held rather than the place where the video-conference terminal devices 100 and 40 are placed.

Video-Conference Transmission Control Unit

The video-conference transmission control unit 15 basically controls the video-conference from the start to the end as follows.

Start and Progress of Video-Conference

When the video-conference transmission control unit 15 receives the video-conference room address from the man-machine control unit 18, the video-conference transmission control unit 15 transmits a start request of the video-conference room address from the network control unit 16 through the network 30 to the video-conference server 50.

This makes the video-conference server 50 generate a video-conference room to start the video-conference, and transmit the video-conference starting completion reply to the video-conference transmission control unit 15.

When the video-conference transmission control unit 15 receives the video-conference starting completion reply from the video-conference server 50, the video-conference transmission control unit 15 transmits the video-conference starting completion reply to the network control unit 18.

After receiving the switching signal to the video-conference, the man-machine control unit 18 switches the video display unit 19 so as to display the display data transmitted from the video-conference transmission control unit 15 to the video display unit 19 in full screen on the video display unit 19. The display data displays the message "The connection is established and the conference is started", for example.

The video-conference transmission control unit 15 receives the digital video signals from the camera image correction control unit 12, and the digital audio signals from the microphone input unit 17. The video-conference transmission control unit 15 then compresses these signals through the network control unit 16 and transmits the signals to the video-conference server 50 through the network 30.

At the same time, the video-conference transmission control unit 15 receives the compressed digital video signals and the compressed digital audio signals from the video-conference server 50 through the network 30 and the network control unit 16, expands them and transmits the digital video signals to the video display unit 19 and transmits the digital audio signals to the speaker output unit 14.

As described above the images and the audio at the business bases captured through the video-conference terminal devices 100 and 40 are transmitted through the video-conference terminal devices 100 and 40 at the business bases, whereby the video-conference is progressed.

Termination of Video-Conference

When the video-conference transmission control unit 15 receives a video-conference termination request from the man-machine control unit 18, the video-conference transmission control unit 15 transmits the video-conference termination request through the network control unit 16 and the network 30 to the video-conference server 50.

Once the video-conference server 50 receives the video-conference termination request signal from the video-conference transmission control unit 15 of any one of the video-conference terminal devices 100 and 40, the video-conference server 50 transmits the video-conference terminating completion reply to the video-conference transmission control unit 15 of the video-conference terminal device 100 or 40 that issued the request, and disconnects the video-conference terminal device 100 or 40 that issued the request from the video-conference room.

When the video-conference transmission control unit 15 in the video-conference terminal device 100 or 40 receives the video-conference termination completion reply, the video-conference transmission control unit 15 transmits a switching signal to a user operation screen to the man-machine control unit 18. After receiving the switching signal to the user operation screen, the man-machine control unit 18 switches the video display unit 19 so as to display the display data transmitted from the man-machine control unit 18 in full screen on the video display unit 19. The display data displays a message "Disconnection is completed", for example.

Wide-Angle Lens Camera

When Distortion Correction Processing is not Performed

Figure 6:
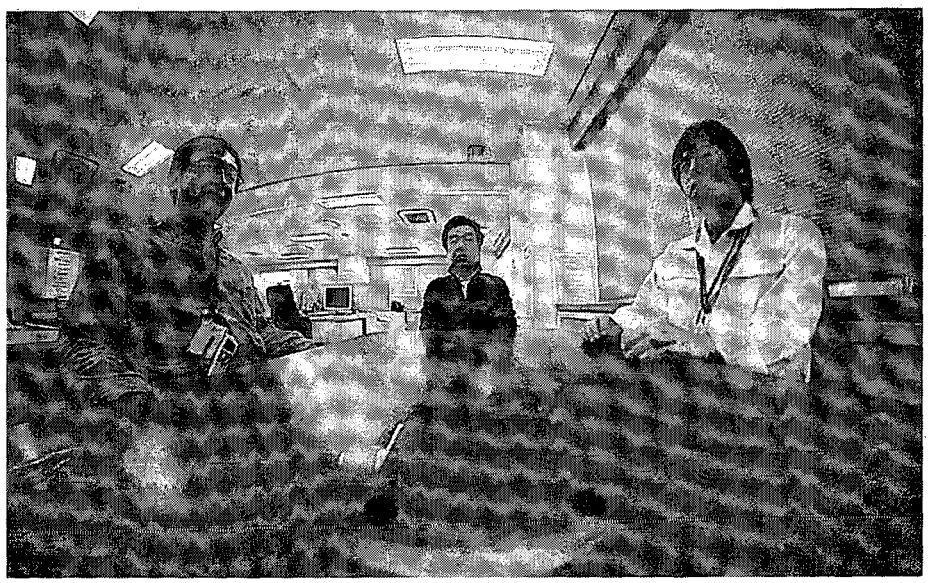
FIG. 6 is a view for explaining an example of an image on which distortion correction processing is not performed.

Wide-angle lenses capturing images in a wide range, however, generate distortion in the images. It is not appropriate, therefore, to use the images as they are in the video-conference, in which people are the subject to be captured. FIG. 6 illustrates an exemplary image of the conference captured through the super wide-angle camera 112.

The three attendees are actually sitting upright around the video-conference terminal device 100 placed on a table in the conference.

In FIG. 6, however, the central attendee is displayed extremely smaller than the two attendees on his sides. The two attendees on the sides are displayed in a roundish and curved shape toward the center of the image from the upper tank of the body to the head. In other words, the two attendees on the sides seem to be in a round-shouldered posture with their heads put forward farther than the upper tank of the body.

This is caused by the distortion of the image generated by the wide-angle lens. As described above, an image with distortion causes an uncomfortable feeling, which makes it psychologically difficult for attendees to continue the video-conference as it is in this state for a long time.

Example of Distortion Correction Processing

Figure 11:
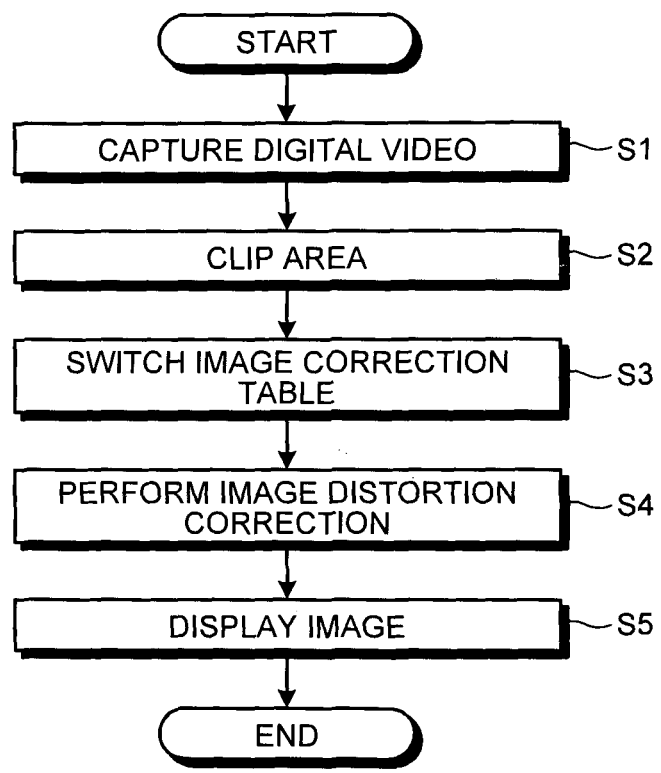
FIG. 11 is a flowchart of an embodiment of an image distortion correction method in the video-conference terminal device for the video-conference system according to the embodiment.

FIG. 11 is a flowchart of an example of procedures when an image distortion correction method is performed. The ROM in the video-conference terminal device 100 stores therein an image distortion correction processing program used for executing the procedures illustrated in this flowchart.

This image distortion correction processing program causes a computer to execute: a step of capturing digital video signals using the super wide-angle camera 112 including the camera lens 10; a step of clipping at least one area from the image included in the digital video signals captured at the step of capturing the digital video signals; a step of switching pieces of image correction information for the distortion correction processing on the clipped area, to select an intended area from the clipped area at the step of clipping at least one area; a step of performing the image distortion correction processing on the area by applying a piece of the image correction information selected at the step of switching pieces of the image correction information to the selected intended area; and a step of displaying the image of the area corrected at the step of performing the distortion correction processing.

The CPU of the video-conference terminal device 100 reads the above-described computer program from the ROM and executes the computer program to perform the procedures illustrated in FIG. 11.

As illustrated in FIG. 11, the CPU firstly captures the digital video signal using the super wide-angle camera 112 including the camera lens 10 (Step S1). As a result, an image as illustrated in FIG. 6 is captured as described above. The CPU then performs the distortion correction processing on the image included in the digital video signal, which will be described later (Step S2 to S5).

The FIGS. 7 to 10 illustrate respective examples of images obtained by performing the distortion correction processing on the image illustrated in FIG. 6 using the video-conference terminal device 100 according to the embodiment of the present invention.

Figure 7:
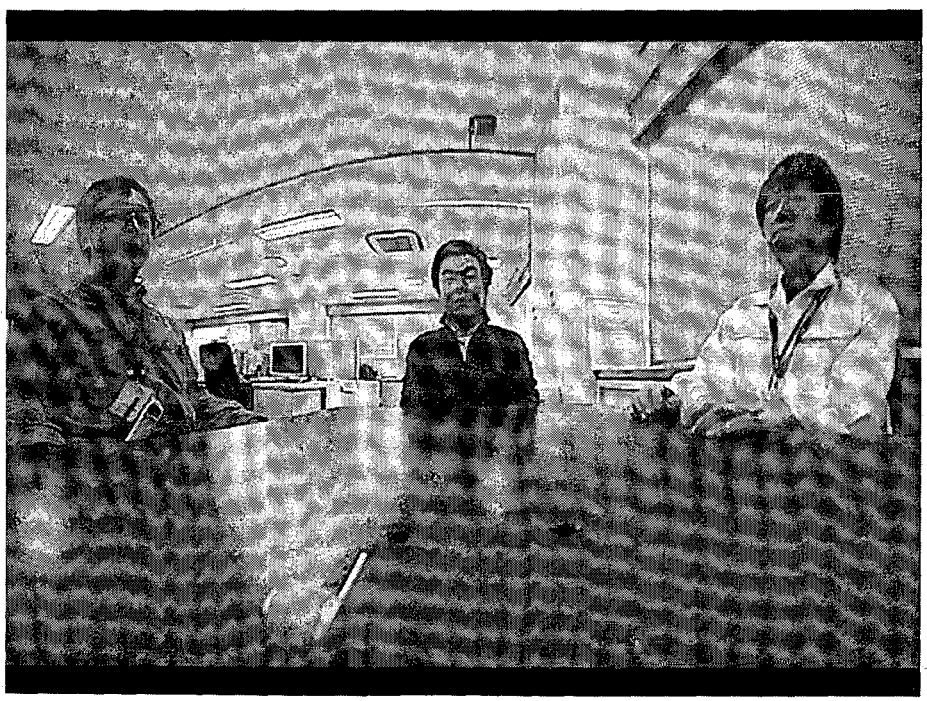
FIG. 7 is a view for explaining an image obtained by performing distortion correction processing on almost the whole of the image illustrated in FIG. 6 in the video-conference terminal device for the video-conference system according to the embodiment.

FIG. 7 illustrates an image obtained by clipping almost the whole of the image displaying the three attendees as exemplified in FIG. 6 and performing the distortion correction processing on the clipped image. It is to be found that the roundish and curved shapes of the two attendees on the sides in FIG. 6 are corrected in FIG. 7. In addition, the central attendee displayed extremely smaller than the other attendees in FIG. 6 is displayed slightly larger in FIG. 7.

Figure 8:
FIG. 8 is a view for explaining an image obtained by performing distortion correction processing on almost the center portion of the image illustrated in FIG. 6 in the video-conference terminal device for the video-conference system according to the embodiment.

FIG. 8 illustrates an image obtained by clipping almost the center portion of the image exemplified in FIG. 6 and performing distortion correction processing on the clipped image. As illustrated in FIG. 8, the distortion correction processing is performed so that only the central attendee is displayed in a large size in the image. This provides a clear vision of the facial expression of the central attendee, for example.

Figure 9:
FIG. 9 is a view for explaining an image obtained by performing distortion correction processing on almost the right side portion and almost the left side portion of the image illustrated in FIG. 6 in the video-conference terminal device for the video-conference system according to the embodiment and combining them into an image.

FIG. 9 illustrates an example of distortion correction obtained by clipping the left side portion and the right side portion of the image exemplified in FIG. 6, performing the distortion correction processing on the clipped images, and displaying them together on one screen. This provides a clear vision of the facial expression of the two attendees on the sides in FIG. 6, for example, because they are also displayed in a large size.

Figure 10:
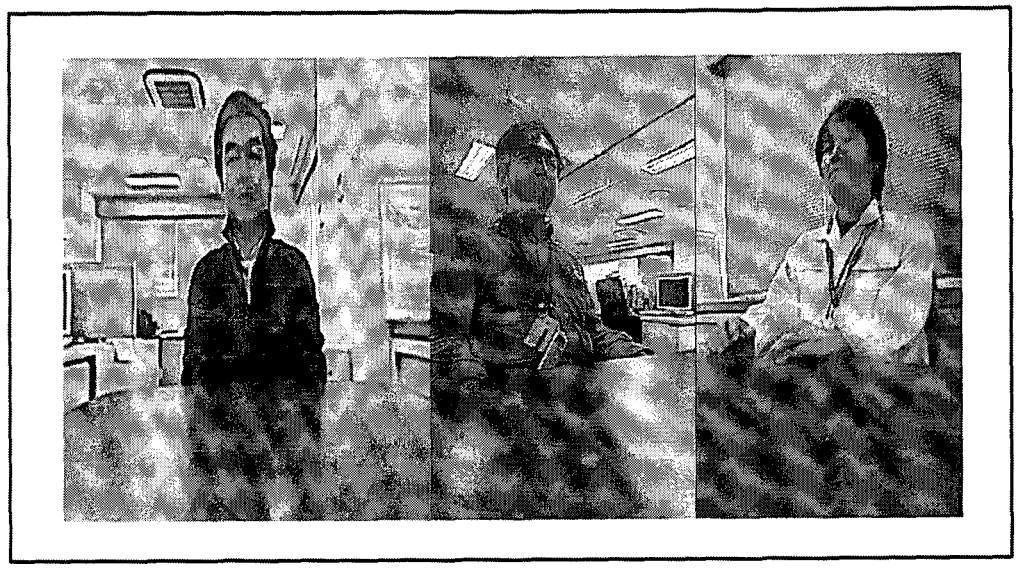
FIG. 10 is a view for explaining an image obtained by performing distortion correction processing on almost the center portion, right side portion, and left side portion of the image illustrated in FIG. 6 in the video-conference terminal device for the video-conference system according to the embodiment and combining them into an image.

FIG. 10 illustrates an image obtained by performing distortion correction processing on the respective images in FIGS. 8 and 9, unifying the size of the images including the respective attendees into almost the same size, and displaying them together on one screen. This provides a clear vision of the facial expression of all of the attendees, for example.

In the above-described image distortion correction processing, as illustrated in FIG. 11, the CPU clips at least one area from the image included in the digital video signal captured at Step S1 at which the CPU captures the digital video signal (Step S2).

The CPU switches the image correction table to the one appropriate for the distortion correction processing on the clipped area to select an intended area from the clipped area at Step S2 (Step S3).

The CPU applies the image correction table selected at Step S3 to the selected intended area and performs the image distortion correction-processing on the area (Step S4).

The CPU then displays the image of the area corrected at Step S4 (Step S5). When the step of preliminarily clipping the area for displaying the image as described above, four dots for determining a rectangular area to be cut out is defined in advance in the distortion correction table. The distortion correction table is applied to only the rectangular area. This process is useful for using the data in the area outside of the clipped image.

At Step S2 illustrated in FIG. 11, at least one area is clipped from the image, however, the following procedures may be performed alternatively. Specifically, Step S2 may be removed and the procedures are performed as follows. The CPU executes Step S3' described below instead of Step S3 illustrated in FIG. 11. The CPU switches the image correction table to the one appropriate for the distortion correction processing corresponding to the displayed content specified through the camera switching key 107 (FIG. 1) on the image included in the digital video signal captured at Step S1 of capturing the digital video signal (Step S3'). The CPU executes Step S4' described below instead of Step S4 illustrated in FIG. 11. The CPU applies the image correction table selected at Step S3' to all of the areas included in the digital video signal captured at Step S1 or the video signal in the selected intended area, and performs the image distortion correction processing on the area (Step S4'). The CPU executes Step S5' described below instead of Step S5 illustrated in FIG. 11. The CPU displays the image of the intended area from the video signal corrected at Step S4' (Step S5').

When these procedures are performed, the distortion correction table represents the relation between the displayed pixels after conversion and the dots of the photoelectric conversion device before conversion, whereby the distortion correction table naturally specifies the display after conversion. Step S2 may be removed, therefore.

In the distortion correction processing, the image correction table appropriate for each image switched to sequentially in the order from FIGS. 7 to 10, for example, is used every time the user presses the camera switching key 107 (FIG. 1) according to the status of the conference, which will be described below.

In the present invention, therefore, the camera image correction table storage unit 13 stores therein the coordinates transformation table as in its image correction table for the distortion correction processing, and the camera image correction control unit 12 switches the image correction table to the appropriate one stored in the camera image correction table storage unit 13. When the camera image correction control unit 12 switches the image correction table, the signals are utilized associated with operations, of the following: the camera display switching key 20 (FIG. 2) corresponding to the camera switching key 107 (FIG. 1); the camera direction switch 21 (FIG. 2) included in the camera rotation mechanism 111 (FIG. 1); and the LCD slant switch 22 (FIG. 2) included in the LCD hinge unit 115 (FIG. 1) used for performing the LCD hinge movement 114. As a result, the image correction processing appropriate for the image of the conference can be selected.

Example of Switching (Using the Image Correction Table Illustrated in FIG. 3)

The image correction tables are switched as described below. It is to be noted that the video-conference terminal device does not include the camera direction switch 21 illustrated in FIG. 2 or the camera rotation mechanism 111 illustrated in FIG. 1 and the camera is fixed in this example, because the direction of the camera and the slant of the LCD are not taken in account in the image correction table illustrated in FIG. 3.

While the conference is proceeding, when a user presses the camera switching key 107, the camera display switching key 20 transmits the camera switching signal to the man-machine control unit 18. After receiving the camera switching signal, the man-machine control unit 18 transmits the camera image correction switching signal to the camera image correction control unit 12. The camera image correction switching signal includes the number of the correction table the user wants to switch to.

The man-machine control unit 18 temporarily stores therein the image correction table number of the correction performed in the video display unit 19. When transmitting digital video data after image correction from the camera image correction control unit 12 to the video-conference transmission control unit 15, which will be described later, the man-machine control unit 18 also receives the image correction table number and stores it therein.

After receiving the camera switching signal from the camera display switching key 20, the man-machine control unit 18 therefore determines the subsequent number of the image correction table out of the image correction tables stored therein. For example, when the image correction table illustrated in FIG. 3 is used, the image correction table number is incremented (increased) by one and the obtained value is divided by the total number of the table numbers (4 in the example illustrated in FIG. 3). The obtained remainder of the division is determined as the image correction table number.

The man-machine control unit 18 transmits the image correction table number included in the camera image correction switching signal to the camera image correction control unit 12. The camera image correction control unit 12 transmits the camera image correction switching signal including the image correction table number illustrated in FIG. 3, for example, to the camera image correction table storage unit 13.

The camera image correction table storage unit 13 transmits the data of the image correction table corresponding to the image correction switching signal to the camera image correction control unit 12. The camera image correction control unit 12 performs image correction according to the data of the image correction table and transmits the digital video data after the image correction to the video-conference transmission control unit 15.

As described above, every time a user presses the camera switching key 107 illustrated in FIG. 1, the man-machine control unit 18 transmits the camera switching signal for displaying images on the liquid crystal display unit 101 in a predetermined order, from the image illustrated in FIG. 7, the image illustrated in FIG. 8, the image illustrated in FIG. 9, and the image illustrated in FIG. 7 again, for example, to the camera image correction control unit 12.

When there are many image-correction tables to be selected, it is preferred that the man-machine control unit 18 displays some examples of the image correction on the video display unit 19 so that the user can select one of them.

Example of Switching 2 (Using Image Correction Table Illustrated in FIG. 4)

The camera rotation mechanism 111 illustrated in FIG. 1 is a mechanism to switch the direction of the super wide-angle camera 112 between the forward (toward the side of the liquid crystal display unit 101) and the backward (toward the side opposite to the side of the liquid crystal display unit 101). A hinge is provided between the camera rotation mechanism 111 and the display unit 100b, therefore the camera rotation mechanism 111 is rotatable.

The direction of the camera "forward" is used for capturing attendees at the conference. While being captured, the attendees of the conference at the local site are watching the attendees of the conference at the remote site on the screen of the liquid crystal display unit 101. The direction of the camera "backward" is used for capturing something else than the attendees at the conference, such as a white board, conference materials, products, or scenes involved in the agenda of the conference.

In respect of the image correction table illustrated in FIG. 4, when the user operates the camera rotation mechanism 111, the image correction table is automatically switched to the one appropriate for the assumed subject to be captured by the camera because the direction of the camera is taken into account in the image correction table.

Along with this switching, with the structure of the camera rotation mechanism 111 illustrated in FIG. 1, when the super, wide-angle camera 112 is directed backwards, the image flips vertical. The coordinates are therefore transformed so that the corrected image also flips vertical. For example, when the super wide-angle camera 112 is switched to backward while it is capturing images in the forward direction so that the image illustrated in FIG. 9 is displayed, the image is automatically switched so as to be flipped vertical and the flipped image is to be corrected.

When the user rotates the camera rotation mechanism 111, the man-machine control unit 18 receives the camera direction signal from the camera display switching key 20. The control method for the distortion correction processing after this is the same when the image correction table illustrated in FIG. 3 is used, except that the image correction table to be switched to is different.

In short, when a user presses the camera switching key 107 illustrated in FIG. 1, the camera display switching key 20 transmits the camera switching signal to the man-machine control unit 18. The man-machine control unit 18 receives the camera direction signal from the camera direction switch 21 that detects the status of the camera rotation mechanism 111.

Figure 12:
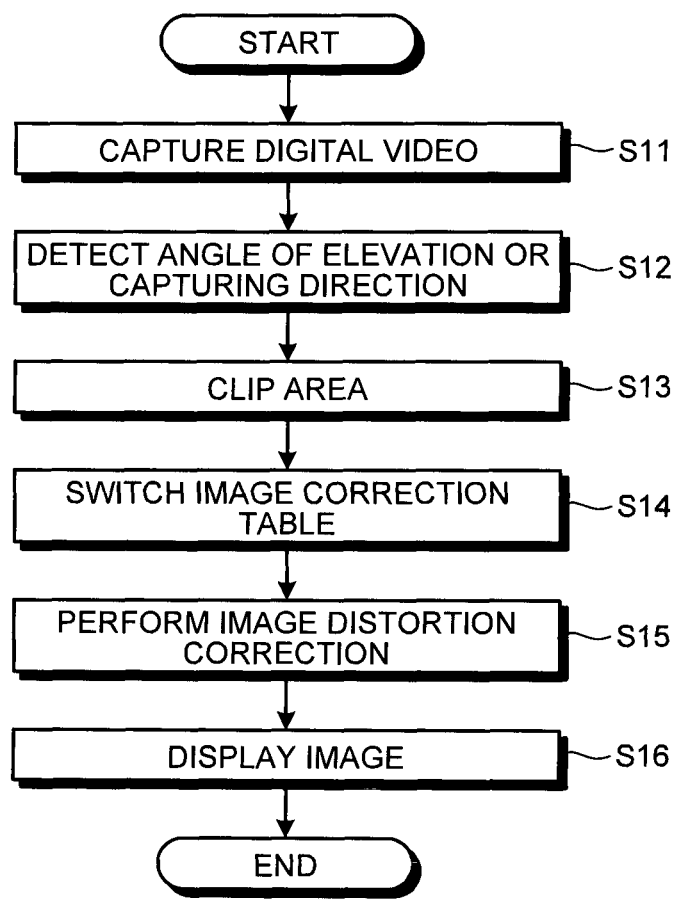
FIG. 12 is a flowchart of an embodiment of an image distortion correction method including a step of detecting the angle of elevation or the direction of a camera in the video-conference terminal device for the video-conference system according to the embodiment.

FIG. 12 is an exemplary flowchart relating to an image distortion correction method including a step of detecting the angle of elevation or the direction of the camera. The flowchart illustrated in FIG. 12 has the same steps as the flowchart illustrated in FIG. 11 except that Step S12 is included for detecting the angle of elevation or the direction of the wide-angle camera.

Step S12 is performed after Step S11 at which the digital video signal is captured using the wide-angle camera including the wide-angle camera lens. If the user presses the camera switching key 107 illustrated in FIG. 1, Step S12 is performed before Step S13 at which an area is clipped.

At illustrated in FIG. 11, at least one area is clipped from the image at Step S13. The following procedures can be performed from Step S13 alternatively. Specifically, Step S13 may be removed.

The CPU then executes Step S14' described below instead of Step S14 illustrated in FIG. 12. The CPU switches the image correction table to the one appropriate for the distortion correction processing corresponding to the displayed content specified through the camera switching key 107 (FIG. 1) for the image included in the digital video signal captured at Step S11 of capturing the digital video signal (Step S14').

The CPU executes Step S15' described below instead of Step S15. The CPU applies the image correction table selected at Step S14' to all of the areas included in the digital video signal captured at Step S11 or the video signal in the selected intended area, and performs the image distortion correction processing on the area(s) (Step S15').

The CPU executes Step S16' described below instead of Step S16. The CPU displays the image of the intended area from the video signal corrected at Step S15' (Step S16').

Step S12 described above detects at least one of the angle of elevation of the camera lens 10 and the capturing direction of the camera lens 10. The image correction tables include an image correction table with the information including at least one of the angles of elevation of the camera lens 10 and the capture direction of the camera lens 10. Only the image correction tables that include the information including at least one of the angle of elevation of the camera lens 10 and the capture direction of the camera lens 10 is the subject to be switched to.

After receiving the camera switching signal and the camera direction signal, the man-machine control unit 18 transmits the camera image correction switching signal to the camera image correction control unit 12. The camera image correction switching signal includes the information on the number of the correction table the user wants to switch to.

At this point, the man-machine control unit 18 temporarily stores therein the image correction table number of the correction performed in the video display unit 19 and the information on the direction of the camera. This is because when transmitting digital video data after image correction from the camera image correction control unit 12 to the video-conference transmission control unit 15 the man-machine control unit 18 also receives the image correction table number and stores it therein, which will be described later.

After receiving the camera switching signal from the camera display switching key 20, the man-machine control unit 18 therefore firstly determines whether the direction of the camera has been changed and then determines the subsequent number of the image correction table out of the image correction tables stored therein.

Figure 13:
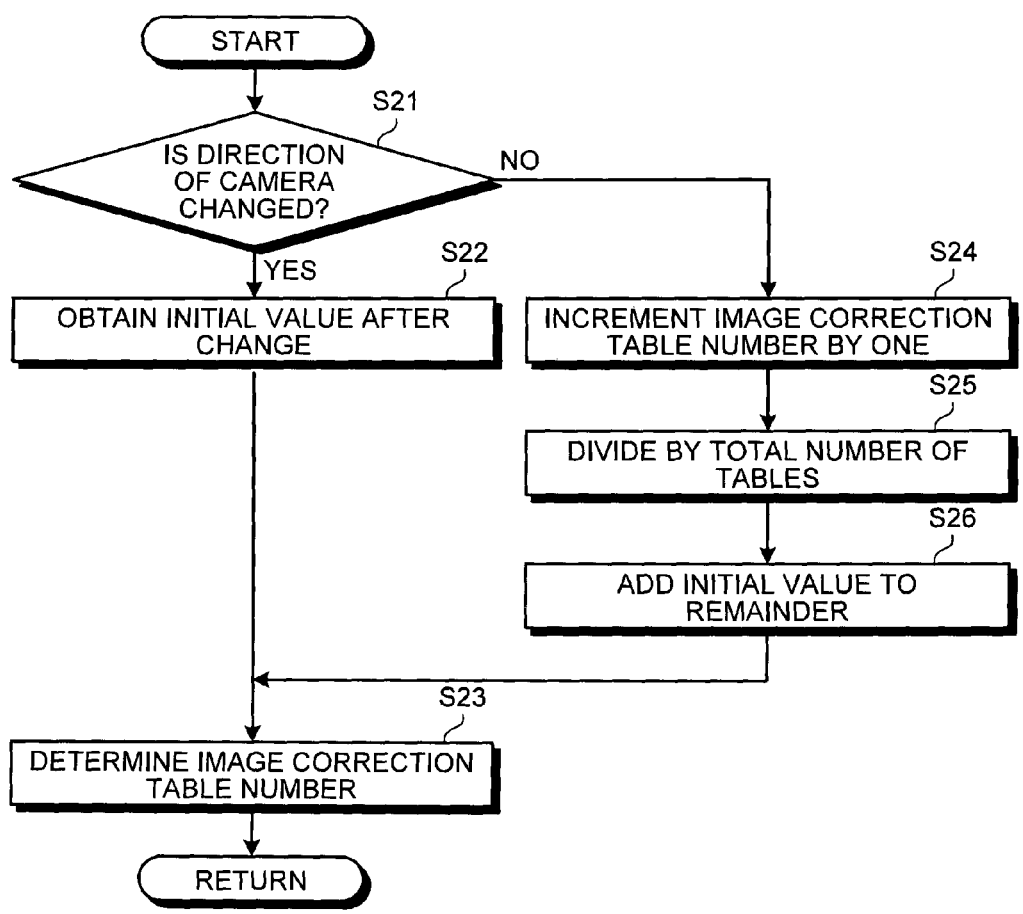
FIG. 13 is an exemplary flowchart for determining the number of an image correction table in the video-conference terminal device for the video-conference system according to the embodiment.

When the number of the image correction table is determined, if the image correction table illustrated in FIG. 4 is used, the procedures in the flowchart illustrated in FIG. 13 are performed.

The CPU determines whether the direction of the camera temporarily stored differs from the direction of the camera obtained by the signal at this point (Step S21).

If the direction of the camera has not been changed, (No at Step S21), the CPU increments the image correction table number for the specific direction of the camera (0 to 3 for the forward) by one (Step S24), divides the obtained value by the total number of the table numbers involved in the specific direction of the camera (4 for the forward and 4 for the backward) (Step S25), and adds the initial value to the remainder of the division (Step S26). This obtained value is determined as the image correction table number (Step S23).

If the direction of the camera has been changed, (Yes at Step S21), the CPU obtains the initial value of the direction of the camera (0 for the forward and 4 for the backward) (Step S22), and determines the obtained value as the image correction table number (Step S23).

Once the image correction table number is determined as described above, the man-machine control unit 18 transmits the camera image correction switching signal including the image correction table number to the camera image correction control unit 12. The camera image correction control unit 12 transmits the camera image correction switching signal including the image correction table number illustrated in FIG. 4, for example, to the camera image correction table storage unit 13.

The camera image correction table storage unit 13 transmits the data of the image correction table corresponding to the received image correction switching signal to the camera image correction control unit 12. The camera image correction control unit 12 performs image correction according to the data of the image correction table and transmits the digital video data after the correction to the video-conference transmission control unit 15.

As described above, if the data of the direction of the camera from the camera rotation mechanism 111 is added, the image correction table can be selected and the image correction is performed appropriately. When there are many image correction tables, the man-machine control unit 18 may display some examples of the image correction on the video display unit 19 so that the user can select one of them.

Example of Switching 3 (Using Image Correction Table Illustrated in FIG. 5)

The LCD hinge unit 115 for the LCD hinge movement 114 is a mechanism to adjust the angle of the LCD. In the video-conference terminal device 100 illustrated in FIG. 1, the liquid crystal display unit 101 and the super wide-angle camera 112 are provided on the display unit 100*b*.

When the angle of the display unit 100*b* is changed due to the LCD hinge movement 114, that is, the LCD slant is changed, the angle of elevation of the super wide-angle camera 112 is also changed.

When the LCD stands upright (the LCD is at the position 90 degrees from the main body 100*a*, for example, the super wide-angle camera 112 captures images in the horizontal direction (the angle of 0 degree with respect to the horizontal plane) and its angle of elevation is 0 degree. When the LCD is in the position tilted 70 degrees from the main body 100*a* and the liquid crystal display unit 101 faces obliquely upward, the super wide-angle camera 112 faces up by 20 degrees with respect to the horizontal plane.

As described above, when the super wide-angle camera 112 faces up, the method for the image distortion correction processing is also changed. In the present embodiment, therefore, the image correction tables corresponding to the degrees of the LCD slant are prepared in advance. When the user operates the LCD hinge mechanism to change the degrees of the LCD slant, the image correction table corresponding to the degrees of the LCD slant is automatically selected.

That is to say, when a user presses the camera switching key 107 illustrated in FIG. 1, the camera display switching key 20 transmits the camera switching signal to the man-machine control unit 18. The man-machine control unit 18 receives the camera direction signal from the camera direction switch 21 that detects the status of the camera rotation mechanism 111 and further receives the LCD slant signal from the LCD slant switch 22 that detects the status of the LCD hinge unit 115.

After receiving the camera switching signal from the camera display switching key 20, the man-machine control unit 18 transmits the camera image correction switching signal to the camera image correction control unit 12. The camera image correction switching signal includes the number of the correction table the user wants to switch to.

At this point, the man-machine control unit 18 temporarily stores therein the image correction table number of the correction performed in the video display unit 19 and the information of the direction of the camera. This is because when transmitting digital video data after image correction from the camera image correction control unit 12 to the video-conference transmission control unit 15, the man-machine control unit 18 also receives the image correction table number and stores it therein, which will be described later.

After receiving the camera switching signal from the camera display switching key 20, the man-machine control unit 18 firstly determines the LCD slant according to the angle of the LCD slant signal from the LCD slant switch 22.

The man-machine control unit 18 then determines whether the direction of the camera has been changed according to the direction of the camera temporarily stored and the direction of the camera received from the camera direction switch 21.

Subsequently, the man-machine control unit 18 determines the subsequent number of the image correction table out of the image correction tables stored therein. When the number of the image correction table is determined, if the image correction table illustrated in FIG. 5 is used, the procedures described below are performed.

The processing procedures here are the same as that in the flowchart illustrated in FIG. 13, therefore illustration thereof is omitted.

The CPU determines whether the direction of the camera temporarily stored differs from the direction of the camera obtained by the signal at this point (corresponds to Step S21).

If the direction of the camera has not been changed, (corresponds to No at Step S21), the CPU increments the image correction table number for the specific direction of the camera (0 to 11 for the forward) by one (corresponds to Step S24), divides the obtained value by the total number of the table numbers involved in the specific direction of the camera (12 for the forward and 8 for the backward) (corresponds to Step S25), and adds the initial value to the remainder of the division (corresponds to Step S26). This obtained value is determined as the image correction table number (corresponds to Step S23).

If the direction of the camera has been changed, (corresponds to Yes at Step S21), the CPU obtains the initial value of the direction of the camera (0 for the forward and 12 for the backward) (corresponds to Step S22), and determines the obtained initial value as the image correction table number (corresponds to Step S23).

Once the image correction table number is determined as described above, the man-machine control unit 18 transmits the camera image correction switching signal including the image correction table and the angle of the LCD slant to the camera image correction control unit 12.

The camera image correction control unit 12 transmits the image correction table number illustrated in FIG. 5 and the camera image correction switching signal including the angle of the LCD slant, for example, to the camera image correction table storage unit 13.

The camera image correction table storage unit 13 obtains an intended image correction table number in the subsequent processing step and transmits the data of the image correction table to the camera image correction control unit 12.

The CPU then searches for the image correction table in which the angle of the display unit 100*b* corresponds to the angle of the LCD slant out of the image correction tables, each of which has the number equal to or larger than the number of the image correction table included in the image correction table switching signal.

If the number of the image correction table exceeds the maximum value for the specific direction of the camera (up to #11 for the forward, up to #19 for the backward), the CPU sets the number of the image correction table to the initial value (#0 for the forward, #12 for the backward), and searches for the image correction table again to determine the data of the image correction table data corresponding to the angle of the LCD slant out of the image correction tables, each of which has the number equal to or larger than the initial value.

After that, the camera image correction control unit 12 performs the image correction processing according to the data of the image correction table and transmits the digital video data after the distortion correction to the video-conference transmission control unit 15.

The processing steps performed in the camera image correction table storage unit 13 are exemplified as below. For example, the image correction table number 4 (the direction of the camera is forward, the LCD slant is 93 degrees) illustrated in FIG. 5 is used and then the LCD slant is changed to 70 degrees while keeping the direction of the camera forward.

At Step S21, the direction of the camera has not been changed, so the processing proceeds to Step S24. As a result of the processing from Steps S24 to S26, the information transmitted by the man-machine control unit 18 to the camera image correction control unit 12 includes the image correction table number "5" and the LCD slant "70 degrees".

The camera image correction control unit 12 firstly determines whether the camera image correction table storage unit 13 stores the image correction table in which the LCD slant is "70 degrees", and which has the number of the image correction table equal to or larger than "5". As a result, the CPU obtains the data of #6 in the image correction table.

Other procedures are optionally performed. The following procedures may be used instead of the above-described steps S24 and after, for example.

The initial value of the image correction table number is obtained, which is the starting point for operating the camera switching key 107. In the correction conversion table illustrated in FIG. 5, the values 0 to 3 are provided for the status of the angle in the column of the LCD slant. The image correction table number is firstly obtained as the initial value. After that, the number 4 is added to the image correction table number.

If the value exceeds the maximum value of the total number for the specific direction of the camera, the number is divided by the total number of the image correction tables (#12 for the forward, up to #8 for the backward) and the remainder of the division is used as the image correction table number. These procedures make it possible to obtain the image correction table number taking the LCD slant into account.

As described above, if the camera rotation mechanism 111 is added, the image correction table can be selected and the image correction is performed appropriately. When there are many image correction tables to be selected, it is preferred that the man-machine control unit 18 displays some examples of the image correction on the video display unit 19 so that the user can select one of them.

According to the above-described embodiment, (1) the most appropriate image distortion correction processing method can be automatically selected according to the status of the conference or the subject to be captured, or can be selected by the user, whereby the wide-angle camera can provide realistic images.

(2) Additionally, the user can switch image correction methods while watching the images using the camera switching key 107 of the operating unit, thereby readily switching image correction methods according to the status of the conference or the subject to be captured.

(3) Furthermore, the image distortion correction processing methods are automatically switched associated with the mode of switching the direction of the camera and the angle of the LCD slant, thereby providing the optimal images to users without an uncomfortable feeling.

Other Embodiments of the Present Invention

Another Example of Distortion Correction Processing

In the embodiment described above, an intended area is clipped from the image captured through the camera and the distortion correction processing is performed on the clipped area. The present invention is not limited to this example. The distortion correction processing may be performed on the image captured through the camera and then an intended area may be clipped from the image on which the distortion correction processing has been performed, as described below.

Figure 14:
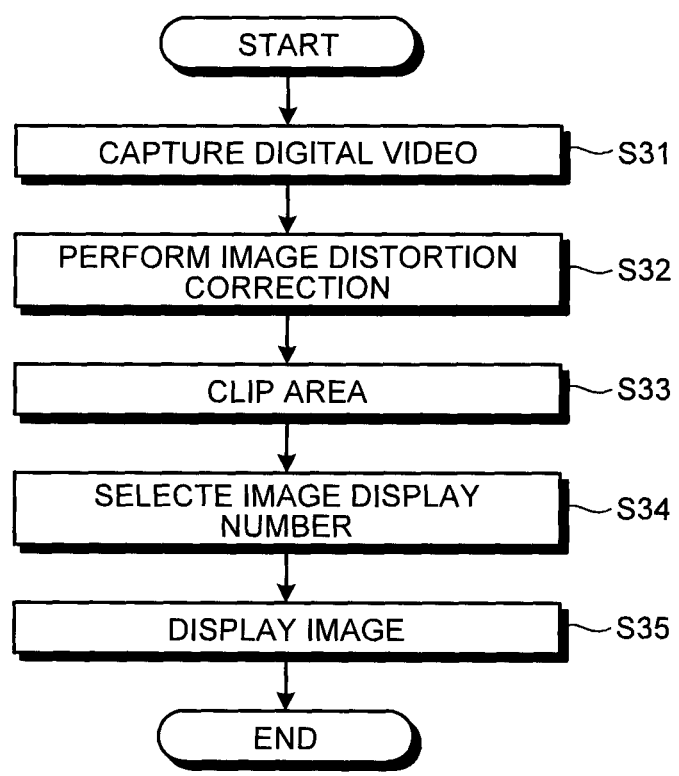
FIG. 14 is a flowchart of another example of the image distortion correction method in the video-conference terminal device for the video-conference system according to the embodiment.

FIG. 14 illustrates a flowchart of an image distortion correction method according to another embodiment. A distortion correction processing program used for performing the procedures in the flowchart is stored in the ROM of the video-conference terminal device 100 in the same manner as the first embodiment described above.

The outline of the distortion correction processing will now be described. As illustrated in the flowchart in FIG. 14, in response to an operator's input, the CPU firstly captures an image through the super wide-angle camera 112 including the camera lens 10 (Step S31).

The CPU then performs predetermined distortion correction processing on the image according to the instruction input by the operator (Step S32). After the distortion correction processing is performed, the CPU clips a specified area from the image on which the distortion correction processing has been performed according to specification of the area input by the operator (Step S33).

Subsequently, when the operator selects the image display number through the camera switching key 107, the CPU selects the predetermined area from the clipped area according to the input signal of the selected image display number (Step S34), and displays the predetermined area on the liquid crystal display unit 101 (Step S35).

The steps will now be described more specifically.

At Step S31, in response to the operator's input, the CPU firstly captures a distorted digital image as illustrated in FIG. 6 or on the upper side in FIG. 15 through the super wide-angle camera 112 including the camera lens 10. Three attendees are displayed in the image, which is distorted, and in which the central attendee is displayed extremely smaller than the two attendees on his sides. The two attendees on the sides are displayed in a roundish and curved shape from the upper tank of the body to the head toward the center of the image.

At Step S32, the distortion correction processing is performed on the displayed image. The distortion correction processing method is performed with the same procedures as the distortion correction processing method performed in the first embodiment.

The correspondence relation between the address of the pixel before distortion correction and the address of the pixel after distortion correction is defined in the image correction table as in the above-described embodiment. According to the correspondence relation, the camera image correction control unit 12 performs the correction for moving the pixel before distortion correction to the address of the pixel after distortion correction.

The correspondence relation of the pixels is displayed in FIG. 15. Specifically, the image on which no distortion correction processing is performed is displayed on the upper side of FIG. 15 and the image on which the distortion correction processing is performed is displayed on the lower side thereof. Three rectangular areas specified by the addresses 1, 2, and 3 are displayed on the upper side image, and three rectangular areas specified by the addresses 1, 2, and 3 are also displayed on the lower side image.

While the distortion correction processing is performed, the three rectangular areas specified by the addresses 1, 2, and 3 displayed on the upper side image are moved by the camera image correction control unit 12 so as to correspond to the respective three rectangular areas specified by the addresses 1, 2, and 3 displayed on the lower side image, as indicated with the arrows.

At Step S33, a predetermined area is clipped from the image after distortion correction by the camera image correction control unit 12.

The method of clipping an area will be described with reference to FIG. 16. Clipping may be performed using the arrow keys (up and down, right and left) 104, for each area that has been set in advance by the manufacturer of the terminal device, for example. Alternatively, clipping may be performed by specifying the clipped positions with a cursor displayed on the screen of the liquid crystal display unit 101 using the arrow keys (up and down, right and left) 104 and pressing the Enter key 105 to execute clipping the image.

When specifying the horizontal and vertical lines to be cut in the image, as will be described later, the horizontal line may be automatically specified according to a predetermined dimensional ratio of the horizontal and vertical dimensions after the vertical line is specified, for example.

Figure 16:
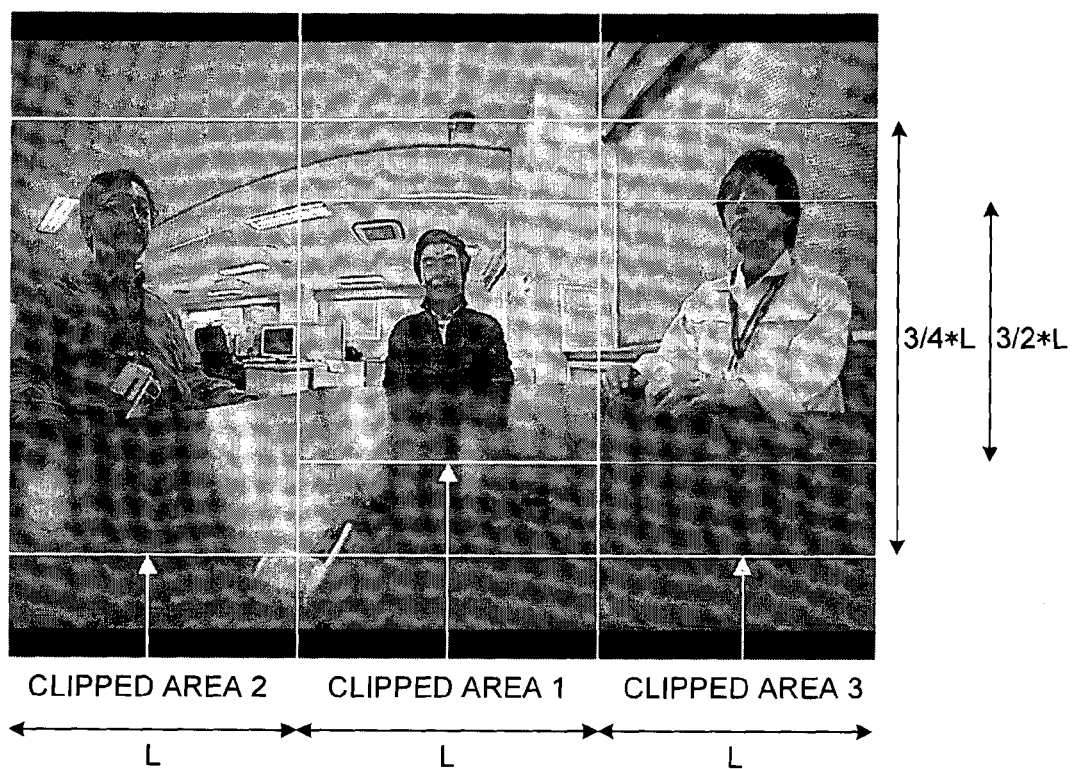
FIG. 16 is a view for explaining an example of a method of clipping an area in the image distortion correction method illustrated in FIG. 14.

To clip intended areas from the image, as illustrated in FIG. 16, the clipped lines are firstly specified so that the horizontal line of the image is divided into three equal lengths of L, thus dividing the image in three areas. In the example illustrated in FIG. 16, the three areas have been clipped by the manufacturer of the terminal device in advance. It is to be noted that FIG. 16 illustrates the same image as the image after distortion correction illustrated on the lower side of FIG. 15.

An image is then clipped from the central image in the three-divided image so that the clipped image has the dimensional ratio of the length to width of 3:4. The ratio corresponds to the screen size of the liquid crystal display unit 101. Typical display devices have the ratio of 3 to 4 or 9 to 16.

This clipping will now be described specifically. The top and bottom parts of the central image in FIG. 6 are cut off so that the remaining clipped image has a length of 3/4L with respect to the width L of the image. It is preferred that this clipping is performed at the top and bottom lines' positions of 3/8*L from the center line of the central image in FIG. 16 in the lengthwise direction. When clipping is performed at these positions, the image is clipped so as to have a length of 3/4L. The clipped image is set as a clipped area 1.

The left side image in the three-divided image in FIG. 16 is clipped so as to have the half width of the screen size of the liquid crystal display unit 101. In other words, the image is clipped so as to have the dimensional ratio of the length to width of 3:2. The top and bottom parts of the left side image in FIG. 6 are cut off so that the remaining clipped image has a length of 3/2*L with respect to the width L of the image. It is preferred that this clipping is performed at the top and bottom lines' positions of 3/4*L from the center line of the central image in FIG. 16 in the lengthwise direction. The clipped image is set as a clipped area 2.

The right side image in the three-divided image in FIG. 16 is clipped so as to have the dimensional ratio of the length to width of 3:2 in the same manner as the clipped area 2, and the clipped image is set as a clipped area 3.

Figure 17:
FIG. 17 is a view for explaining the relation between clipped areas through the image distortion correction method illustrated in FIG. 14 and displayed images.

Through the procedures of clipping as described above, the three clipped images are the images of the areas enclosed with the respective lines of the clipped area 1, the clipped area 2, and the clipped area 3 as illustrated in FIG. 17.

The images of the clipped area 1, the clipped area 2, and the clipped area 3 can be stored in the storage unit of the camera image correction control unit 12.

At Step S34, every time the operator presses the camera switching key 107, the operator can select the image display number displayed on the liquid crystal display unit 101.

Figures 18, 19:
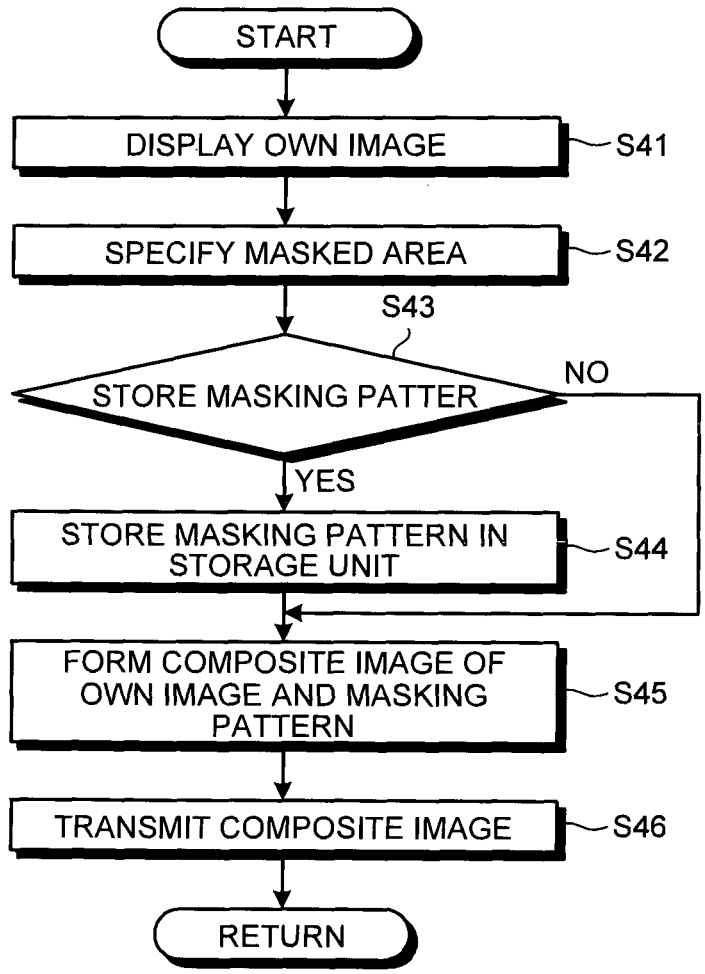
FIG. 18 is, a view for explaining the relation between the clipped areas through the image distortion correction method illustrated in FIG. 14 and video display numbers.
FIG. 19 is a flowchart of an example of a method of masking a part of an image or clipping the image through the image distortion correction method in the video-conference terminal device for the video-conference system according to the embodiment.

FIG. 18 illustrates the correspondence relation between the images of the clipped areas 1, 2, and 3 and the image display numbers. The "whole" in the "clipped image" column in FIG. 18 represents the image after distortion correction that has not been clipped. For example, the "whole" image corresponds to the image after distortion correction illustrated on the lower side of FIG. 15.

The "center" in the "clipped image" column in FIG. 18 represents the image illustrated in the clipped area 1. For example, the "center" image corresponds to the image illustrated in FIG. 8.

The "right and left" in the "clipped image" column in FIG. 18 represents the image in which the clipped area 1 and the clipped area 2 are combined together. For example, the "right and left" image corresponds to the image illustrated in FIG. 9.

The "center, right and left" in the "clipped image" column in FIG. 18 represents the image in which the clipped areas, 1, 2, and 3 are combined together. For example, the "center, right and left" image corresponds to the image illustrated in FIG. 10.

The respective image display numbers 0, 1, 2, and 3 correspond to "whole", "center", "right and left", "center, right and left" in the "clipped image" column in FIG. 18. By operating the camera switching key 107, the image display number can be selected.

Once the image display number is selected by operating the camera switching key 107, the image specified with the image display number is read out from the storage unit of the camera image correction control unit 12 and displayed on the liquid crystal display unit 101 at Step S35.

As described above, according to the present embodiment, the distortion correction processing is performed in advance on the image captured through the camera sensor 11 to determine an area to be clipped, whereby the clipped area has a good appearance. In addition, the relation between the whole image and the clipped area can be readily recognized.

Example of Specifying Masked Area

In the distortion correction processing according to the first embodiment and the other embodiment described above, the forming method for the clipped area has no flexibility, and sometimes bothers the user for removing one or more areas from the image. Another distortion correction processing method will be described in which a masked area can be readily specified for clipping or masking an intended area.

In the present embodiment, the video display unit 19 includes a touch panel module and a touch panel control unit (not illustrated). The touch panel module is a capacitance touch panel, for example, through which a user can input information with his finger or a stylus.

The camera image correction control unit 12 includes a storage unit capable of storing therein the data relating to the masked areas, in the present embodiment.

FIG. 19 illustrates a flowchart of forming a masked area after the video-conference is started.

Firstly, the attendee sitting in the front of the video-conference terminal device 100 inputs a predetermined command by operating the menu key 103, the arrow keys (up and down, right and left) 104, and the Enter key 105, the CPU displays an image of the attendee sitting in the front of the video-conference terminal device 100 on the liquid crystal display unit 101 of its own video-conference terminal device 100 before transmitting the image of the attendee himself to the video-conference terminal device of an attendee of the other party of the conference (Step S41).

After that, when the operator specifies an area to be clipped or an area to be masked on his own image displayed on the (touch panel) liquid crystal display unit 101 with his finger or the tip of the stylus, the CPU forms a masking pattern according to a signal from the touch panel module (Step S42). The operator can specify a plurality of areas.

Figure 20:
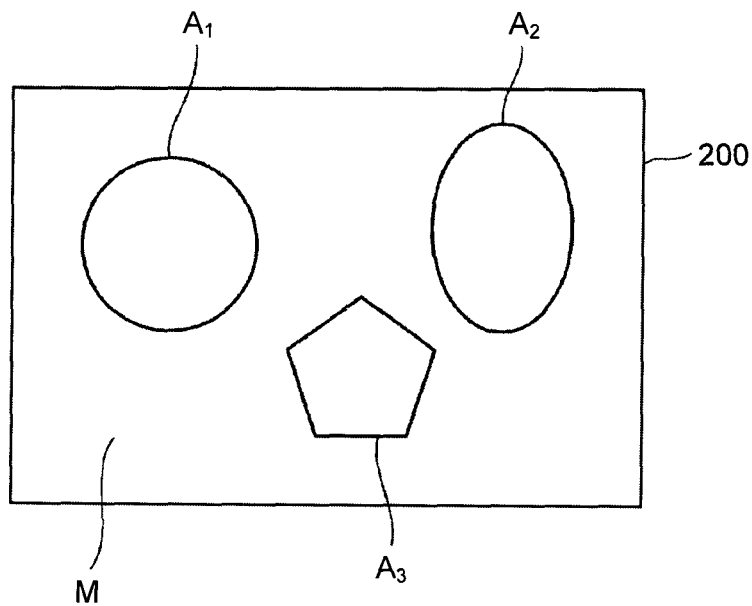
FIG. 20 is a view for explaining an example of the method of masking a part of an image or clipping the image illustrated in FIG. 19.

More specifically, with reference to FIG. 20, an image 200 of the operator's side is displayed on the (touch panel) liquid crystal display unit 101. When the operator encloses areas such as a circle A1, an ellipse A2, and a pentagon A3, using the tip of his finger and the like and specifies an area M as a masked area excluding the enclosed areas above in the image 200, through a key operation, the CPU identifies the area M as a masked pattern.

As a result, when the image 200 is displayed on the display screen of the video-conference terminal device of the other party of the conference, the areas A1, A2 and A3 are displayed, but the area M excluding the above areas are not displayed on the image 200. This achieves privacy protection in the conference readily and securely.

Instead of forming a new masking pattern, the operator may read the masking pattern previously stored and display the pattern on the image by operating the menu key 103, the arrow keys (up and down, right and left) 104, and the Enter key 105.

Once the position and the shape of the masking pattern is determined, the CPU stands by an input of determination by the operator on whether he stores the masking pattern in the storage unit of the storage unit of the camera image correction control unit 12 (Step S43).

If the operator is to store the masking pattern in the storage unit of the camera image correction control unit 12, an appropriate name is added to the masking pattern and input for storing, whereby the CPU stores the masking pattern in the storage unit of the camera image correction control unit 12 (Step S44).

Subsequently, when the operator inputs a request for forming a composite image, the CPU reads out the stored masking pattern and forms an image composed of the read out masking pattern and the image of the operator (Step S45). If the masking pattern is used, only this time, and is not stored and when the operator inputs a request for forming a composite image, the CPU forms an image composed of the masking pattern displayed on the screen and the image of the operator without reading out the stored masking pattern (Step S45).

In response to the input by the operator, the CPU transmits the composite image to the video-conference terminal device of the attendee at the video-conference of the ether party through the network 30 (Step S46).

After the transmission, when the displayed image is changed or the subject to be masked is changed, the procedures of the flowchart is performed again from Step S41.

According to the present embodiment, the area to be clipped can be flexibly changed, whereby the issue of privacy is solved and the layout of display can be changed flexibly.

Example of Adjusting Brightness

An example of adjusting the brightness of the image will now be described, which can be applied to any one of the distortion correction processing methods according to the embodiments above. This is useful when the clipped area 2 has a different lightness from the clipped areas 1 and 3 illustrated in FIG. 17, for example, the brightness of the clipped area 2 can be adjusted to equalize the lightness of all of the areas.

For adjusting the brightness like this, the camera image correction table storage unit 13 of the video-conference terminal device 100 may include the brightness adjustment table illustrated in FIG. 21.

The brightness adjustment table illustrated in FIG. 21 includes three types of tables. The table 1, for example, includes the coordinate value representing the starting point and the ending point in the X-axis direction and the starting point and the ending point in the Y-axis direction in the X and Y coordinates for determining the range of a brightness standard area 1, and a brightness adjustment value 1. The X-axis direction corresponds to the horizontal direction of the displayed image, and the Y-axis direction corresponds to the vertical direction thereof.

The brightness standard area 1 serves as a standard of the brightness in the clipped area in which the brightness is to be adjusted. The brightness adjustment value 1 is the value indicating the increase and decrease of the brightness level to be adjusted with respect to the brightness in the area, which is the standard of the brightness.

The tables 2 and 3 specify areas that differ from each other and from the area to which the table 1 is applied and include brightness adjustment values that differ from each other and from the area to which the table 1 is applied.

FIG. 22 illustrates a flowchart for adjusting of the brightness of the image.

Firstly, the operator performs an input by operating one or more keys used for selecting the image of the clipped areas included in the image to be transmitted. The CPU then reads out the images from the storage unit of the camera image correction control unit 12 and displays the read out images on the liquid crystal display unit 101 (Step S51).

The operator watches the displayed images of the clipped areas to select one of the images of the clipped areas in which the brightness is to be adjusted, using the arrow keys (up and down, right and left) 104. The CPU proceeds the processing from Step S52 to Step S53, and then displays the image of the clipped areas in which the brightness is to be adjusted, on the screen of the terminal device.

When the operator selects a plurality of images of the clipped areas, the CPU displays these images of the clipped areas on the display unit of the terminal device.

If the operator selects no area in which the brightness is to be adjusted (for example, no signal to select an image is input until a predetermined time elapsed since the image is displayed), the CPU transmits the image to be transmitted as it is to the video-conference terminal device of the other party of the video-conference (Step S58).

The image of the clipped area in which the brightness is to be adjusted is displayed on the display screen and the operator specifies the brightness adjustment table at Step S53. The CPU then reads out the specified table from the camera image correction table storage unit 13 (Step S53).

Figure 23:
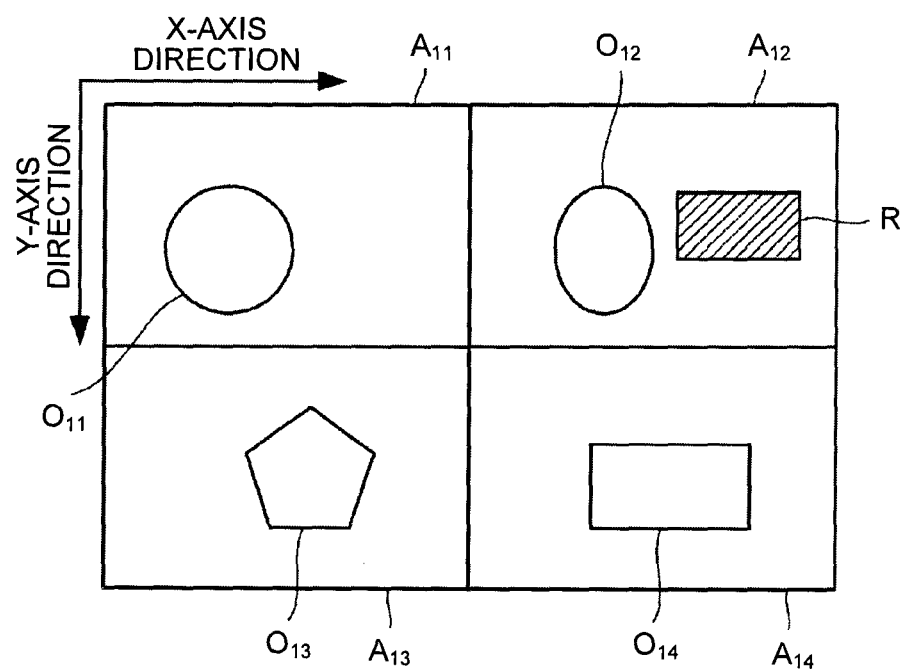
FIG. 23 is an exemplary view for explaining a method of adjusting the brightness of the clipped image that has been clipped according to the flowchart illustrated in FIG. 22.

FIG. 23 illustrates four clipped areas A11, A12, A13, and A14, which are displayed on the liquid crystal display unit 101 for adjusting the brightness of the areas. The attendees or others are displayed on each of the areas O11, O12, O13, and O14 in the four clipped areas A11, A12, A13, and A14.

Adjusting the brightness of the area A12 will be described. A brightness standard area R is identified in the area A12 as the brightness standard area determined in the brightness adjustment table specified at Step S54.

The CPU obtains the brightness of the brightness standard area R by detecting the brightness level of the already captured image and applies the brightness adjustment value defined in the specified brightness adjustment table, to the value of the detected brightness level. The brightness is displayed conceptually in 10 levels, for example, from the darkest level 0 to the brightest level 10. If the value of the detected brightness corresponds to the level 7, to which the level of the brightness adjustment, −2, for example, is applied, the brightness level to be adjusted for the area A12 becomes level 5. The CPU changes the brightness of the area A12 according to this value of the level to the brightness corresponding to the value of the brightness level to be achieved (Step S55).

The image of the area A12 in which the brightness has been adjusted is then displayed on the liquid crystal display unit 101 (Step S56).

The operator displays the image for brightness adjustment through the key operation again, for adjusting the brightness of the image. The processing proceeds from Step S57 to Step S54 again. The CPU then stands by an input for specifying another brightness adjustment table.

If the operator determines that the brightness adjustment has succeeded and the menu screen is shifted to a transmission screen, the processing proceeds from Step S57 to Step S58. At Step S58, the images of the clipped areas that have been selected as subjects to be transmitted are displayed on the liquid crystal display unit 101. When the operator performs an input for transmitting the images, the CPU transmits the images.

As described above, the brightness adjustment according to the present embodiment can be applied to the respective images that are clipped before the distortion correction processing is performed. Alternatively, the brightness adjustment according to the present embodiment can be applied to the respective images that are clipped after the distortion correction processing is performed. Through the procedures as described above, the brightness adjustment can be applied to one or more clipped areas from a certain image. The present embodiment, therefore, mitigates an uncomfortable feeling, which is caused by a variance in brightness among the clipped areas.

Example of Distortion Correction Processing in Remote Terminal

The image distortion correction processing according to any one of the embodiments described above is performed in the local video-conference terminal device 100, for example, operated by the user at the local site. An attendee captured through the camera of the local video-conference terminal device 100 is, however, visually recognized by an attendee watching the liquid crystal display unit of the remote video-conference terminal device 40.

Taking this into account, the image distortion correction processing may be performed as follows. The user determines an intended image through the remote video-conference terminal device 40 to be displayed using the menu key 103 of the local video-conference terminal device 100. Then, the user may utilize a camera switching key, for example, of the remote video-conference terminal device 40 to switch the images for performing the image distortion correction processing on the image the user wants to display.

Specifically, the procedures are performed as follows. The user selects one of the remote video-conference terminal devices 40 the user wants to operate, using the menu key 103 and enters it. The man-machine control unit 18 of the local video-conference terminal device 100 obtains the information to uniquely identify the entered remote video-conference terminal device 40 from the video-conference server 50.

After specifying the remote video-conference terminal device 40 the user wants to operate, the man-machine control unit 18 of the local video-conference terminal device 100 receives the camera switching signal from the camera display switching key 20. The man-machine control unit 18 interprets the camera switching signal as an operation signal for the specified remote video-conference terminal device 40 rather than for the local video-conference terminal device 100 itself.

This makes the man-machine control unit 18 of the local video-conference terminal device 100 transmit the information to uniquely identify the entered remote video-conference terminal device 40 and the camera switching signal to the video-conference transmission control unit 15.

The video-conference transmission control unit 15 of the local video-conference terminal device 100 transmits the information including the camera switching signal through the network control unit 16 and the network 30, according to the information to uniquely identify the entered remote video-conference terminal device 40 to the specified remote video-conference terminal device 40.

When the video-conference transmission control unit 15 in the specified remote video-conference terminal device 40 is notified of the information relating to the camera switching through the network 30 and the network control unit 16, the video-conference transmission control unit 15 transmits the information including the information relating to the camera switching signal, the direction of the camera, and the LCD slant to the man-machine control unit 18.

The man-machine control unit 18 deals with the camera switching signal in the same manner as the camera switching signal and the like of its own video-conference terminal device 100. The man-machine control unit 18 therefore performs the image distortion correction processing following the procedures described above. As a result, the image displayed on the liquid crystal display unit of the remote video-conference terminal device 40 is the image of a mode the user of the remote video-conference terminal device prefers.

When the video-conference transmission control unit 15 is notified of the information relating to the camera switching obtained from the remote video-conference terminal device 40, the processing may be performed as follows. The arrow with an alternate long and two short dashes line is provided as illustrated in FIG. 2, which represents data transmission from the video-conference transmission control unit 15 to the camera image correction control unit 12. That is to say, the control can be performed directly from the video-conference transmission control unit 15 to the camera image correction control unit 12.

With this structure, the video-conference transmission control unit 15 transmits the information including the camera switching signal and the information relating to the direction of the camera, and the LCD slant to the camera image correction control unit 12 (illustrated with the alternate long and two short dashes line). The camera image correction control unit 12 can deal with the camera switching signal in the same manner as the camera switching signal and the like of its own video-conference terminal device 100.

In the same manner when the man-machine control unit 18 is used, the man-machine control unit 18 performs the image distortion correction processing following the procedures described above. As a result, the image displayed on the liquid crystal display unit of the remote video-conference terminal device 40 is the image of a mode the user of the remote video-conference terminal device prefers.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A video-conference terminal device, comprising:
    a wide-angle camera comprising a wide-angle camera lens;
    a first control unit that receives a digital video signal from the wide-angle camera and performs distortion correction processing on an image included in the digital video signal;
    a memory that stores therein image correction information used when the first control unit performs the image distortion correction processing, the image correction information comprising at least information for specifying a plurality of areas in the image included in the digital video signal from the wide-angle camera, the plurality of specified areas being determined in advance, the image correction information including a plurality of pieces of image correction information, and each of the plurality of pieces of image correction information being stored in association with a corresponding one of the plurality of areas;
    a second control unit that transmits images of the plurality of specified areas on which the distortion correction has been performed to another video-conference terminal device coupled to a network;
    a providing unit that provides the images of the plurality of specified areas on which the distortion correction has been performed; and
    an operating unit that switches pieces of the image correction information stored in the memory and outputs the information every time being operated, some or all of the plurality of areas being selected when the operating unit is operated, and, in response to the selection of the areas, pieces of image correction information corresponding to the selected area being selected from the plurality of pieces of image correction information, wherein
    the first control unit performs distortion correction processing on the image including the plurality of specified areas using a piece of the image correction information that has been selected by the operating unit.

2. The video-conference terminal device according to claim 1, wherein the plurality of specified areas of the image included in the digital video signal from the wide-angle camera comprises a combination of two or more selected from almost the whole, an almost center portion, an almost right side portion, and an almost left side portion of the image including the specified areas.

3. The video-conference terminal device according to claim 1, further comprising an information display that is provided from the providing unit with and displays the digital video signal of the wide-angle camera and the digital video signal on which the distortion correction has been performed.

4. The video-conference terminal device according to claim 3, further comprising:
    an information display slant detection unit, wherein
    when the information display slant detection unit outputs an information display slant signal, the memory selects a piece of the image correction information corresponding to the information display slant signal out of the image correction information stored in the memory, and
    the first control unit determines the selected piece of the image correction information as a subject to be used when the distortion correction processing is performed on the image including the plurality of specified areas.

5. The video-conference terminal device according to claim 1, further comprising:
    a camera direction detection unit that detects a capturing direction of the wide-angle camera, wherein
    when the camera direction detection unit outputs a camera direction signal, the memory selects a piece of the image correction information corresponding to the camera direction signal out of the image correction information stored in the memory, and
    the first control unit determines the selected piece of the image correction information as a subject to be used when the distortion correction processing is performed on the image including the plurality of specified areas.

6. The video-conference terminal device according to claim 1, wherein the image correction information further comprises correction information representing a relation that specifies a subject on which the distortion correction processing is to be performed under a predetermined condition.

7. A video-conference system, comprising:
    at least two video-conference terminal devices according to claim 1; and
    a video-conference server that controls a video-conference held between the at least two video-conference terminal devices, wherein
    the video-conference terminal devices and the video-conference server are coupled to each other through a network.

8. An image distortion correction method, comprising:
    capturing a digital video signal through a wide-angle camera comprising a wide-angle camera lens;
    clipping at least one area from an image included in the digital video signal captured at the step of capturing the digital video signal;
    switching pieces of image correction information for distortion correction processing on the clipped area, to select some or all of a plurality of areas from the area clipped at the step of clipping at least one area, the selected plurality of areas being determined in advance, the image correction information including a plurality of pieces of image correction information, each of the plurality of pieces of image correction information being stored in association with a corresponding one of the plurality of areas, and in response to the selection of the areas, pieces of image correction information corresponding to the selected area being selected from the plurality of pieces of image correction information;

performing the distortion correction processing on the image including the selected plurality of areas by applying a piece of the image correction information selected at the step of switching pieces of the image correction information to the selected plurality of areas; and providing an information display with an image including the selected plurality of areas corrected at the step of performing the distortion correction processing.

9. The image distortion correction method according to claim 8, further comprising:

detecting at least one of an angle of elevation of the wide-angle camera and a capturing direction of the wide-angle camera, wherein the image correction information comprises pieces of the image correction information including information on at least one of the angle of elevation of the wide-angle camera and the capturing direction of the wide-angle camera, when the at least one of the angle of elevation of the wide-angle camera and the capturing direction of the wide-angle camera is detected at the step of detecting at least one of the angle of elevation of the wide-angle camera and the capturing direction of the wide-angle camera, only the pieces of the image correction information including the information on the at least one of the angle of elevation of the wide-angle camera and the capturing direction of the wide-angle camera are determined as a subject to be switched at the step of switching the image correction information.

10. A computer program product comprising a non-transitory computer-usable medium having computer-readable program codes embodied in the medium, wherein the program codes when executed cause a computer to execute:

capturing a digital video signal through a wide-angle camera comprising a wide-angle camera lens;

clipping at least one area from an image included in the digital video signal captured at the step of capturing the digital video signal;

switching pieces of image correction information for distortion correction processing on the clipped area, to select some or all of a plurality of areas from the area clipped at the step of clipping at least one area, the selected plurality of areas being determined in advance, the image correction information including a plurality of pieces of image correction information, each of the plurality of pieces of image correction information being stored in association with a corresponding one of the plurality of areas, and in response to the selection of the areas, pieces of image correction information corresponding to the selected area being selected from the plurality of pieces of image correction information;

performing the distortion correction processing on the image including the selected plurality of areas by applying a piece of the image correction information selected at the step of switching pieces of the image correction information to the selected plurality of areas; and providing an information display with an image including the selected plurality of areas corrected at the step of performing the distortion correction processing.

* * * * *